US006785704B1

(12) United States Patent
McCanne

(10) Patent No.: US 6,785,704 B1
(45) Date of Patent: Aug. 31, 2004

(54) CONTENT DISTRIBUTION SYSTEM FOR OPERATION OVER AN INTERNETWORK INCLUDING CONTENT PEERING ARRANGEMENTS

(75) Inventor: Steve McCanne, Berkeley, CA (US)

(73) Assignee: FastForward Networks, San Francisco, CA (US)

( * ) Notice: Subject to any disclaimer, the term of this patent is extended or adjusted under 35 U.S.C. 154(b) by 777 days.

(21) Appl. No.: 09/609,442

(22) Filed: Jul. 3, 2000

Related U.S. Application Data

(60) Provisional application No. 60/172,746, filed on Dec. 20, 1999.

(51) Int. Cl.[7] .................................................. G06F 9/00
(52) U.S. Cl. ..................... 709/105; 709/201; 709/203; 709/225; 709/238; 709/239; 709/245
(58) Field of Search ................................. 709/201–203, 709/105, 224–225, 238–239, 244–246

(56) References Cited

U.S. PATENT DOCUMENTS

| 5,611,049 A | 3/1997 | Pitts |
| 5,956,716 A | 9/1999 | Kenner et al. ................. 707/10 |
| 6,003,030 A | 12/1999 | Kenner et al. ................. 707/10 |
| 6,052,718 A | 4/2000 | Gifford ....................... 709/219 |
| 6,085,234 A | 7/2000 | Pitts et al. |
| 6,112,239 A | 8/2000 | Kenner et al. ............... 709/224 |

OTHER PUBLICATIONS

Rosenzweig, Phil, et al., "The Java™ Reliable Multicast™ Service: A Reliable Multicast Library," Sun Microsystems Laboratories—SML Technical Report Series, Sep. 1998, 20 pages.
Hardie, T., "Distributing Root Name Serverd Via Shared Unicast Addresses," draft article, Internet Society 1999, http://www.ietf.org/proceedings/99/nov/I–D/draft–ietf–dnsop–hardie–shared–root–server–00.txt, 6 pages.

*Primary Examiner*—Jack B. Harvey
*Assistant Examiner*—Hieu C. Le
(74) *Attorney, Agent, or Firm*—Philip H. Albert; Townsend and Townsend and Crew, LLP

(57) ABSTRACT

In a network interconnecting a plurality of content providers and a plurality of clients, for providing content to a client, each of the plurality of content providers is coupled to at least one content distribution network of a plurality of content distribution networks, wherein the client is coupled to at least one of the plurality of content distribution networks and a request for the content is sent from the client to a redirector node that receives requests, wherein a redirector at the redirector node provides an address for a server available to serve the requested content. When the client's content distribution network is a primary content distribution network for the content provider providing the requested content, redirecting the client to a server within the client's content distribution network. When the client's content distribution network is not a primary content distribution network for the content provider but the client's content distribution network has a content peering relationship with a primary content distribution network for the content provider, redirecting the client to a server within the client's content distribution network. When the client's content distribution network is not a primary content distribution network for the content provider and the client's content distribution network does not have a content peering relationship with a primary content distribution network for the content provider, redirecting the client to a server outside the client's content distribution network. The redirecting can be done using a domain name service (DNS) server that responds to requests for domain name resolution that include metadata encoding for the content being requested and/or attributes of the resolution request other than a domain name or explicit client/redirector communication to perform the redirection.

12 Claims, 19 Drawing Sheets

CONTENT DISTRIBUTION SYSTEM FOR OPERATION OVER AN INTERNETWORK INCLUDING CONTENT PEERING ARRANGEMENTS

CROSS-REFERENCES TO RELATED APPLICATIONS

This application claims priority from Provisional U.S. Patent Application No. 60/172,746, entitled "A Content Distribution System For Operation Over An Internetwork Including Content Peering Arrangements", filed Dec. 20, 1999. The disclosures of the following applications assigned to the assignee of the present application are also incorporated in their entirety herein by reference for all purposes:

U.S. Provisional Patent Application No. 60/152,257, entitled "A Proximity-Based Redirection System For Robust And Scalable Service-Node Location In An Internetwork", filed Sep. 3, 1999 (hereinafter referred to as "McCanne et al. I");

U.S. Pat. No. 6,415,323, entitled "A Proximity-Based Redirection System For Robust And Scalable Service-Node Location In An Internetwork", filed Dec. 9, 1999 (hereinafter referred to as "McCanne et al. II");

U.S. Pat. No. 6,611,872, entitled "Performing Multicast Communication In Computer Networks By Using Overlay Routing", filed Jun. 1, 1999 (hereinafter referred to as "McCanne I").

BACKGROUND OF THE INVENTION

The present invention relates to efficient transmission of data in an internetwork, such as the global internetwork known as the "Internet". More specifically, the present invention relates to moving live or stored "broadcast" data streams from content producers to large numbers of recipients of those data streams.

"Broadcasting" refers to the transmission of a data stream from a content producer to a large number of recipients. The data stream can be text, graphics, video, audio, or any other digital data stream. Data is often provided as a stream or as a file, with the distinction being that the end of the stream is open-ended, while the file has a defined end. For example, real-time stock quotes might be thought of as a stream of data, while a 30-minute audiovisual presentation might be thought of as a file of data. As referenced herein, a sharp distinction is not needed between what is a stream and what is a file, since the typical broadcast operation is very similar whether a stream is being transmitted or a file is being transmitted. Therefore, it should be understood that where a stream is described, a file could be substituted therefor unless otherwise indicated.

Broadcasting need not be done in real-time relative to the content creation. Real-time broadcasting refers to the transmission of the data as it is created in a digital form. For example, a football game might be recorded by a camera, digitized and broadcast to many individuals wanting to receive the transmission over the Internet. The football game might also be stored after digitization and broadcast at a later time. Furthermore, the football game could be both transmitted live and transmitted at a later time ("delayed broadcast"). Generally speaking, whether the broadcast is live or delayed, some of the components of a broadcast network might operate exactly the same, as is the case with current television broadcasting. For example, the antennas broadcasting the signal and the receivers receiving the signal operate identically to receive live broadcasts or delayed broadcasts.

One technical difference between live broadcasting and delayed broadcasting is that live broadcasting is likely to have a larger audience at the time of the broadcast, since there is only one time to tune into a live broadcast but many times might be available for a delayed broadcast. Some content is more likely to be desired by recipients as a live broadcast rather than a delayed broadcast. Examples include sporting events, time-sensitive business information such as stock quotes, analyst interviews and breaking news, and the like.

The line between live and delayed broadcasting is not a fixed line. One of the challenges of live broadcasting is to process the data stream in real-time to make it suitable for transmission (e.g., compression, formatting), whereas more time is available for those processing steps if the data stream is a delayed broadcast. While that challenge highlights a distinction between live and delayed broadcasting, if the delayed broadcasts are only available at set times, as is the case with television reruns, live and delayed broadcasting do not differ greatly. Because the line is not always clear, it should be understood that "broadcasting" refers to live and/or delayed broadcasting unless otherwise indicated.

Relative to the current demands of Internet users, current television broadcasting is simple: the content creators provide their content to the broadcasters, who send out the data stream into a channel that is exclusively reserved for their content and has the bandwidth to carry that content in the time allotted and the medium of transfer (being wired or wireless) and the receivers are all connected to the medium with a bandwidth sufficient to receive all the data stream with minimal processing from a channel dedicated to that content. On the other hand, broadcasting content over the Internet (or any other internetwork or network being used) cannot be done easily, as the Internet or network is essentially a point to point transmission medium, with some provision for point-to-multipoint or multipoint-to-multipoint transmission.

For example, broadcast television deals with a breaking news event by gathering information, writing a script and putting a reporter on the air. The recipients of the breaking news (the television watchers) must wait for the broadcast television station to broadcast the information and they get only the data stream that that content provider chooses to present. When news breaks on the Internet, a large number of users will try to retrieve the news information (essentially as a large number of point-to-point transmissions of the same data stream), often swamping the servers and computing infrastructure of the content provider. This "flash effect" is not limited to breaking news, but is often encountered when live events occur, when new releases of popular software are issued or when a popular Web site is encountered. Herein, a "Web site" generally refers to a collection of pages presented as a unit, usually served from one or more coordinated servers having a particular network address and may also refer to the computers and infrastructure that serve the pages of the collection.

The problems of current broadcasting approaches are described below, but first some background of client-server architecture is in order. Many networking and other computing systems have the processing and functionality of the overall system separated into "clients" and "servers" where the clients are computers, programs or hardware that initiate requests and servers are computers, programs or hardware that respond to requests from clients. There are exceptions, where devices or programs generally thought of as servers will make requests of devices or programs generally thought of as clients, but for the most part, in the client-server model, the servers wait around for requests, service the requests and then wait around for further requests. Clients are usually considered more independent actors, in that they initiate requests. It should be understood, however, that some devices or hardware could be clients at some times or for some purposes and servers at other times or for other purposes.

In the context of an extremely basic broadcast infrastructure, a content server waits for a request from a content client and upon receipt of a request sends the requested content to the content client. This basic infrastructure is fine when one client makes a request of one server and the content fits in unused bandwidth of a channel connecting the client and server, but since most networks have more than one client or more that one server and share a limited bandwidth, the bandwidth needs to be intelligently allocated.

From an infrastructure perspective, the flash effect is not very bandwidth-efficient, as many, many identical copies of the data stream are transported over the network to the many recipients requesting the data stream. This effect might not be a problem if the data stream is a few bits of data, but data streams of full-motion video and CD-quality audio are becoming more and more common.

Several different approaches have been made in the past to provide for broadcasting over the Internet, but most have drawbacks that prevent their widespread adoption. Two key mechanisms for the Internet have been proposed and are in limited used to overcome the problems induced by the flash effect, namely, 1) caching and 2) server replication. Caching refers to a process of using a cache situated at strategic locations within the network infrastructure to intercept content requests from clients so that the content source does not need to provide every copy of the content. When a client requests content from a content server and the client receives the content from the content server, a cache in the network through which the content passes stores a copy of the content. When other client (or the same client) makes a request for that same content, the network infrastructure consults the cache to determine if a copy of the requested content exists in the cache. If the content exists in the cache, the request is intercepted before it gets to the content server and the cache instead services the request. Otherwise, if the content is not present in the cache, the request is relayed to the content server and the response relayed back to the client.

Caching is useful when there is a high probability that the requested content would happen to be present in the cache. Since the cache has a finite storage capacity allocated for storing cached content, the cache will eventually have to discard some of its stored content to make room for more recent, or more popular, content. Many strategies have been proposed and are in use for managing the local store of the cache, e.g., deciding when to discard an object from the cache, when to "refresh" content (get a fresh, possibly updated copy of content from the content server), and so forth.

Caching can be either transparent or nontransparent. With transparent caching, the client makes a request of the content server and the network infrastructure intercepts the request if the cache can serve the request. With nontransparent caching, the client makes the request of the cache (or more precisely, of a network node to which the cache is attached) and the cache serves the request, if it can, or forwards the request to the content server and then serves the client the content returned from the content server.

The server replication mechanism involves replicated servers each holding copies of the same content being served. Preferably, the replicated servers are deployed across a wide area of the network and client requests to a content server are redirected to one of these distributed replicated servers to balance load and save network bandwidth. For example, if the clients making requests are all connecting to a network at one network entry point and the content server is at the far end of the network, the replicated servers might be located near the client network entry point so that the content does not need to travel the length of the network. These replicated servers may have some or all of the content contained at the origin content server and many variations exist for arranging particular servers in a replicated server deployment, for distributing content to the replicated servers from the origin content server, and for determining how clients are redirected to the appropriate replicated server.

A similar content distribution problem involves the delivery of live streaming media to many users across the Internet. With live streaming media, a server produces a live broadcast feed and clients connect to the server using streaming media transport protocols to receive the broadcast as it is produced. As more and more clients tune in to the broadcast, the server and network near the server become overwhelmed by the task of delivering a large number of packet streams to a large number of clients. This task is unnecessarily duplicative, because the server is sending out multiple streams of the same data (one stream per client).

The duplication exists because each connection from one client to the server is a "unicast" connection, i.e., a one-point-to-one-point connection. The basic connection between two points in a network such as the Internet is a unicast connection. Although unicast data may flow over many different paths (routes), it is identifiable as data from one source node at a source address to one destination node at a destination address. Because of this, each client needs its own connection to the server and the data stream is duplicated in the network by the number of clients requesting that data stream.

Network multicasting partially solves the problem of unnecessary duplication of data streams. Multicasting at the network layer can be done over the Internet using IP multicasting protocols that are defined in the Internet architecture. With multicasting, a content server transmits the data stream as a single stream of packets addressed to a "multicast group" instead of sending individual copies of the stream to individual unicast addresses. While a client normally receives only packets addressed to that client's unicast address, a client interested in the multicasted stream can "tune in" to the broadcast by subscribing to the multicast group. In IGMP (the Internet Group Management Protocol), the client subscribes to an "IP Multicast" group by signaling to the nearest router with subscription information. The network efficiently delivers the broadcast to each receiver client by carrying only one copy of the data stream and fanning out additional copies only at fan out points in the distribution path from the source (the content server) to the receivers. Thus, only one copy of each packet appears on any physical link.

Unfortunately, a wide variety of deployment and scalability problems have confounded the acceptance and proliferation of IP Multicast in the global Internet. Many of these problems follow fundamentally from the fact that computing a multicast distribution tree requires that all routers in the network have a uniformly consistent view of what that tree looks like. To use IP multicasting effectively, each router must have the correct local view of a single, globally consistent multicast routing tree. If routers have disparate views of a given multicast tree in different parts of the network, then routing loops and black holes are inevitable. A number of other problems—e.g., multicast address allocation, multicast congestion control, reliable delivery for multicast, etc.—have also plagued the deployment and acceptance of IP Multicast. Despite substantial strides recently toward commercial deployment of IP Multicast, the resulting infrastructure is still relatively fragile and its reach is extremely limited.

Not only have there been substantial technical barriers to the deployment of a ubiquitous Internet multicast service, but there are business and economic barriers as well. Internet service providers have not had much success at offering wide-area multicast services because managing, monitoring, and provisioning for multicast traffic is quite difficult. Moreover, it is difficult to control who in a multicast session can generate traffic and to what parts of the network that traffic is allowed to reach. These problems become even worse when service providers attempt to peer with one another to offer a wider-reaching multicast service, as they have done with resounding success for traditional unicast service. Because of these barriers, the emergence of a multicast service that reaches the better part of the Internet is unlikely and such emergence in the near future is very unlikely.

Others have proposed work-arounds to avoid the pitfalls of multicast, such as splitter networks. A splitter network is an application-level solution for transporting streaming-media broadcasts, where a set of servers is distributed across a network at strategic locations across the Internet. For example, a data distributor might co-locate splitters at an ISP's premises or make an arrangement with the ISP for a large-scale deployment within the ISP's network. For example, RealNetworks, of Seattle, Wash., provides for streaming media distribution. The distribution is at the application level in that a RealNetworks™ G2 server might send G2 data streams to G2 clients.

These distributed servers are configured with a "splitting" capability, which allows them to replicate a given stream to a number of downstream servers. With this capability, servers can be arranged into a tree-like hierarchy, where the root server sources a stream to a number of downstream servers, which in turn split the stream into a number of copies that are forwarded to yet another tier of downstream servers.

Unfortunately, a splitter network of servers is plagued with a number of problems. First, the tree of splitters is statically configured, which means that if a single splitter fails, the entire sub-tree below the point of failure loses service. Second, the splitter network must be oriented toward a single broadcast center, requiring separate splitter networks composed of distinct physical servers to be maintained for each broadcast network. Third, splitters are typically specific to one data stream format making the splitter platform dependent. For example, a splitter set up to carry RealNetworks™ data streams cannot distribute Microsoft™ Netshow™ data streams. Fourth, splitter networks are highly bandwidth inefficient since they do not track receiver interest and prune traffic from sub-trees of the splitter network that have no downstream receivers. Finally, splitter networks provide weak policy controls—the aggregate bit rate consumed along a path between two splitter nodes cannot be controlled and allocated to different classes of flows in a stream-aware fashion.

Yet another approach to avoid the problems of multicast is to have the content broadcast to several locations around a network and have the client run a test to determine the least congested path to a server having the content of interest. The client then connects to the server showing the least congested path the client. While is this good for file-centric applications, as opposed to stream-centric applications, this approach has drawbacks. For example, while the client might find a server with low congestion, little or nothing is done to ensure that the server closest to particular clients has the data that those clients are most requesting. Another problem is that many applications are live broadcasts and thus delivery of the data is time-sensitive and the data needs to be moved quickly to the edge servers that are serving the clients that are interested in the live broadcast while limiting the amount of network congestion that occurs on the network that is not bound for users interested in the broadcasts.

SUMMARY OF THE INVENTION

One embodiment of the present invention provides for an improved data stream broadcast distribution by using content peering.

In a network interconnecting a plurality of content providers and a plurality of clients, for providing content to a client, each of the plurality of content providers is coupled to at least one content distribution network of a plurality of content distribution networks, wherein the client is coupled to at least one of the plurality of plurality of content distribution networks and a request for the content is sent from the client to a redirector node that receives requests, wherein a redirector at the redirector node provides an address for a server available to serve the requested content. When the client's content distribution network is a primary content distribution network for the content provider providing the requested content, redirecting the client to a server within the client's content distribution network. When the client's content distribution network is not a primary content distribution network for the content provider but the client's content distribution network has a content peering relationship with a primary content distribution network for the content provider, redirecting the client to a server within the client's content distribution network. When the client's content distribution network is not a primary content distribution network for the content provider and the client's content distribution network does not have a content peering relationship with a primary content distribution network for the content provider, redirecting the client to a server outside the client's content distribution network.

The redirecting can be done using a domain name service (DNS) server that responds to requests for domain name resolution that include metadata encoding for the content being requested and/or attributes of the resolution request other than a domain name. Other possible mechanisms include application-level redirection or a new client network protocol for this application.

The content distribution system can be independent of the content created, but sone systems might be set up for particular content, such as television and radio streams. The streams might be original broadcast signals or retransmission of over-the-air signals.

A further understanding of the nature and advantages of the inventions herein may be realized by reference to the remaining portions of the specification and the attached drawings.

DESCRIPTION OF THE SPECIFIC EMBODIMENTS

A few examples of specific embodiments of content peering architectures according to the present invention are described herein. Others may become apparent after reading this description and it should be understood that the invention is not limited to these specific examples, but is limited only by the appended claims. Furthermore, while specific methods and apparatus are shown, it should be apparent upon reading this disclosure that some of the methods can be practiced using different apparatus and the apparatus shown could be used to perform different methods than shown.

This description discloses how to make and use several embodiments of a system according to the present invention, but for brevity omits descriptions of many well-known components of such systems. For example, the operation and design of a standard TCP/IP network, standard TCP/IP clients and the like are not explicitly disclosed herein, as they well described in countless readily available sources.

In the description below, like elements of the figures are referenced with like numbers. Distinct instances of like elements might be referenced with like numbers followed by distinct instance numbers in parentheses. This description is organized according to the following outline:

1. Existing Content Distribution Models and a General Network Architecture
   1.1. Existing Content Distribution Models
   1.2. Edge Servers
   1.3. Content Distribution Service Providers (CSPs)
2. General Architectures for Content Distribution and Peering
3. Constructing a Network with Content Peering
   3.1. Federated Redirection
      3.1.1. Administratively Provisioned Interdomain Anycast Routing ("APAR")
      3.1.2. Content Backbone
      3.1.3. Anycast Peering Configuration
      3.1.4. DNS-based Content Peering
      3.1.5. Explicit Redirection
   3.2. Content Distribution Naming System
   3.3. Content Distribution via Application-level Routing
   3.4. Enhanced Server Capabilities
4. Client-driven Service Rendezvous (CDSR)
   4.1. General CDSR Architectures
   4.2. Wide-area Deployment
   4.3. Staged Deployment
   4.4. Web-server Staged Deployment

1. Existing Content Distribution Models and a General Network Architecture

Figure 1:
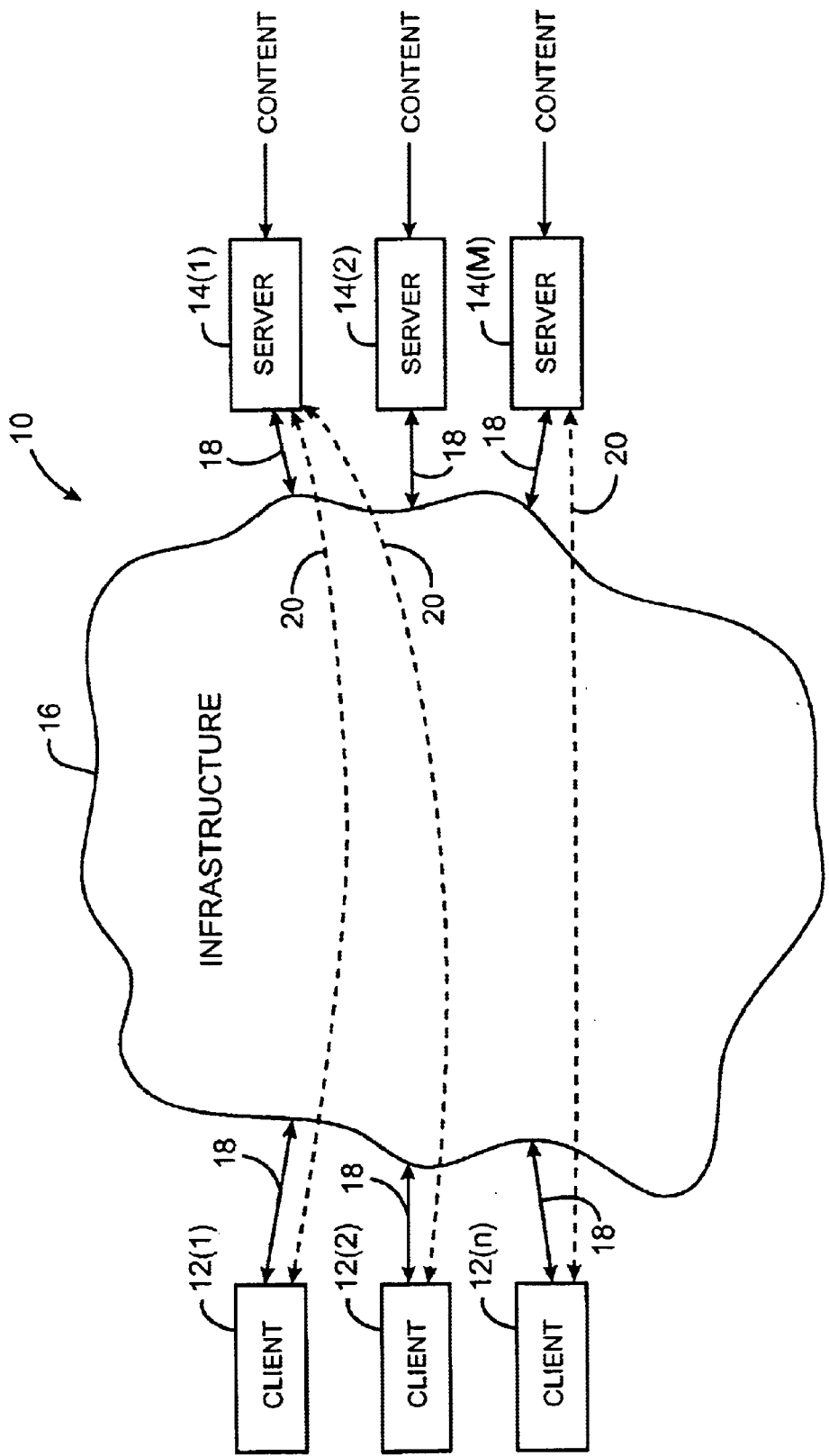
FIG. 1 is a block diagram of a generalized client-server network system.

FIG. 1 is an illustration of a system 10 in which clients 12 are connected to servers 14 via an infrastructure 16. In the examples used here, the global Internet is used as one example of infrastructure 16, but it should be understood that infrastructure 16 is not so limited. For example, infrastructure 16 might be implemented as a subset of the global Internet, an intranet, extranet, local area network, Internet II network, or the like or an overlay on an existing network architecture. Also, while the TCP/IP protocols are used as an example for networking and data is shown, for example, travelling in packets, infrastructure 16 might be implemented using different protocols without departing from the scope of the invention.

Figure 2:
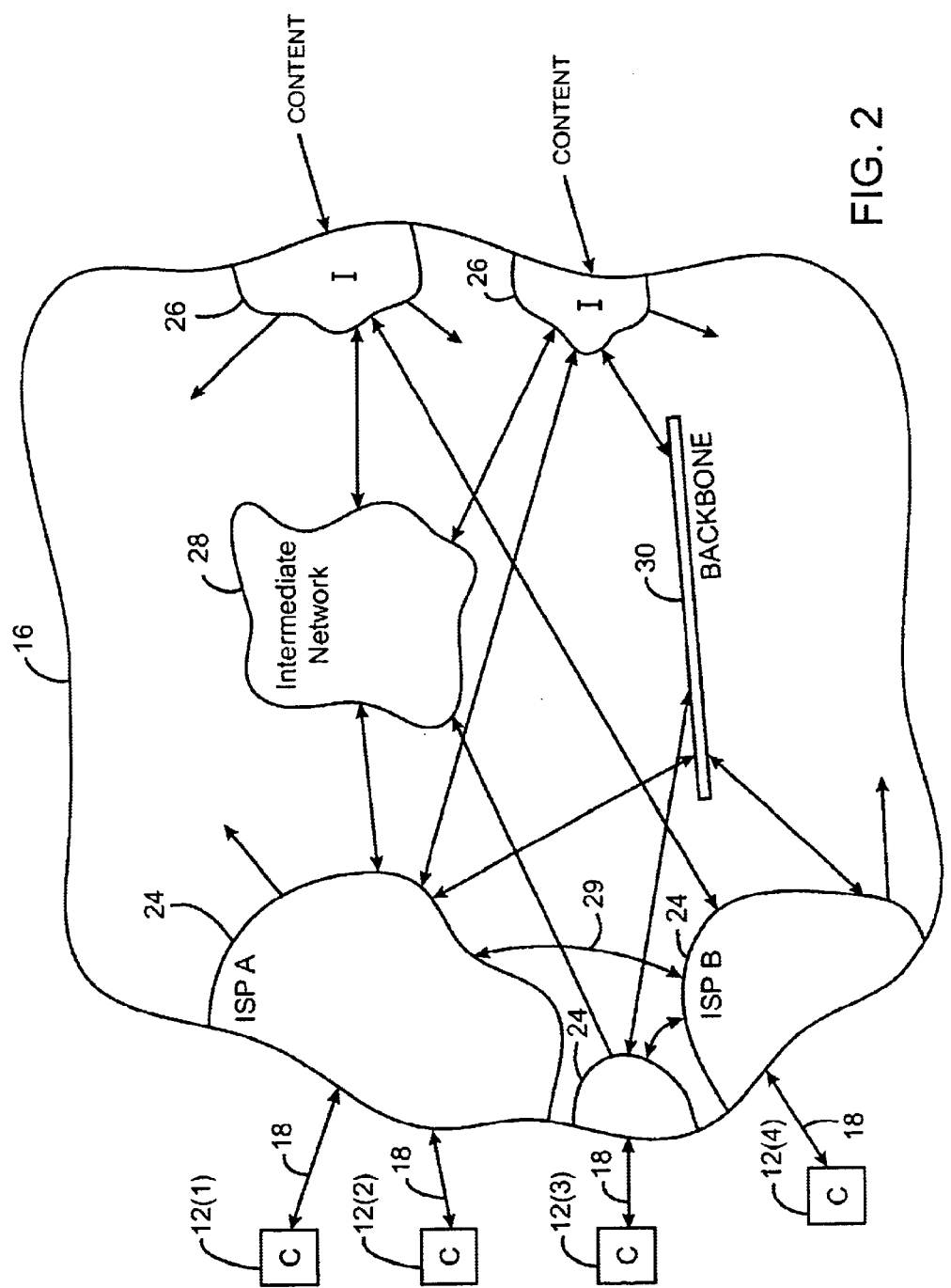
FIG. 2 is a block diagram showing the network shown in FIG. 1 in greater detail.

FIG. 2 shows infrastructure 16 in greater detail, as a network with clients connecting to the network at entry points such as Internet Service Provider (ISP) points-of presence (PoPs) and content being provided at injection points.

Figure 3:
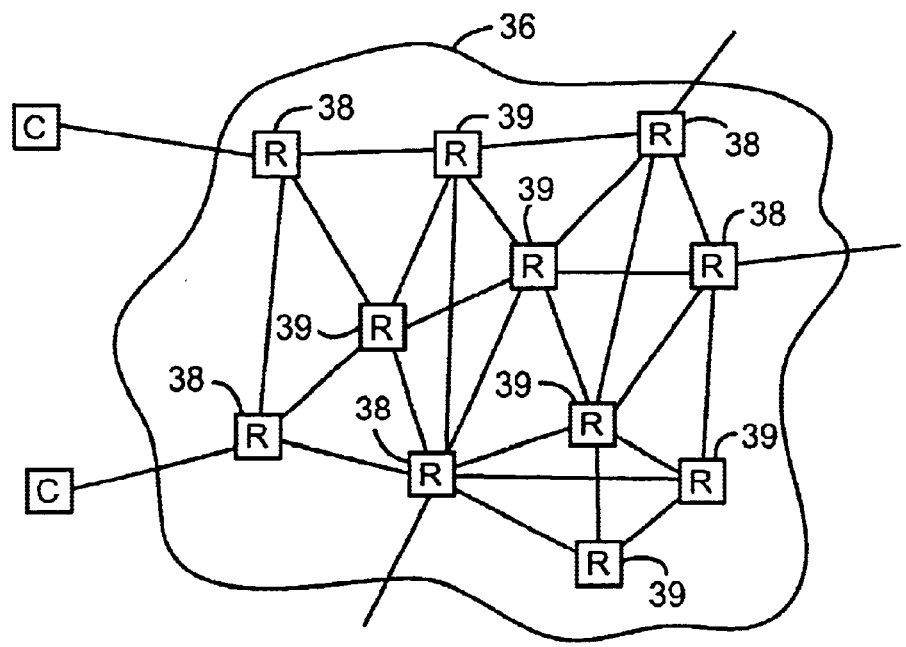
FIG. 3 is a block diagram of a network with a routing structure.

FIG. 3 illustrates one network connection wherein clients connect to the network at edge routers 38 and data travels through the network in "hops" where a hop is a data transfer from one router (an edge router 38 or an internal router 39) to another on its way from a data source to a data destination.

Figure 4:
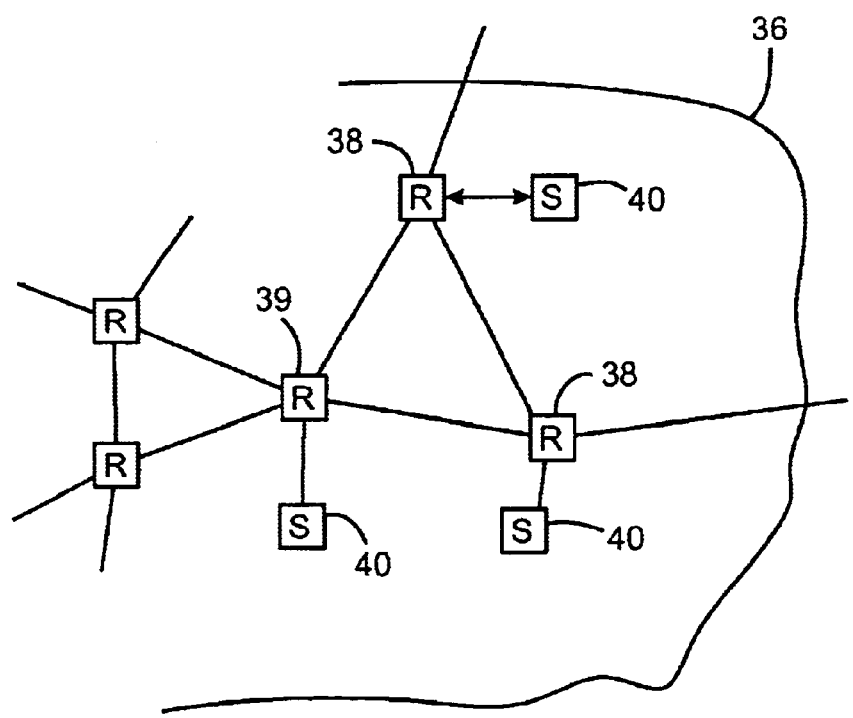
FIG. 4 is a block diagram showing a portion of the network of FIG. 3 including servers coupled to routers in the network.

FIG. 4 illustrates network 36 in greater detail, showing servers 40 that reside within network 36 to respond to requests. Note that each server 40 is coupled to the network via a router so that data flowing among the routers can be received by and transmitted from servers 40. Servers 40 need not be fundamentally different than content servers 14 shown in FIG. 1, although they usually serve different purposes.

1.1. Existing Content Distribution Models

Data stream distribution is explained below, but first some background on existing content distribution models is set forth to explain the context of distribution in the novel system. It should be understood that, while many examples refer to the distribution of a data stream, the system could be also be used to carry nonstreaming data, such as files or blocks of data of defined length.

In one common distribution model currently in use, Internet content is created and realized by authoring Web pages and placing them on a staging Web server, or by digitizing audio/video signals. This is generally illustrated in FIG. 1. Content is published into the Internet at injection points, labelled "I" in FIG. 2. The injection points might comprise a production server that contains the data stream (or file or data block, as the case may be), ready for broadcast to many clients, with the production server being coupled to the source of the content (a Web page producer, digital camera, or other source) via a simple LAN connection or the like. In more complicated configurations, a data stream from a remote venue like a concert site or sports event might be transported across a dedicated link (e.g., a dial-up ISDN line, a leased T1 line, or a frame relay connection) to a production server facility where the data stream is placed on the production server. Once the content is published on the production server, any client on the Internet can access that content with a Web or streaming-media connection between the production server and the client.

The single production server model works only up to a certain scale. Because each client creates its own individual connection to the server, the server can easily become overwhelmed when serving up popular content. This is especially true when access is synchronized, e.g., for a live event, so that the server needs to simultaneously send many separate copies of the content to each requesting client. This not only overwhelms the throughput of the server but it also places undue burden on the network near the server site, which must carry the same content across the same network link many redundant times.

1.2. Edge Servers

One common approach for overcoming this problem is to place server devices like Web caches or streaming-media splitters at or close to the "edge" of the network. For example, in a typical ISP network, the ISP has many interconnected nodes and some of the nodes are PoP (point of presence) nodes. A PoP node is a node that a customer of the ISP can hook onto to connect to the Internet. One common PoP node has a bank of dial-in modems to which customers can dial up and connect. Other nodes might be entirely internal to the ISP and be inaccessible to the customer. Typically, the nodes that are PoP nodes, or nodes one router "hop" away from a PoP (one hop "into" the ISP network) are considered "edge" nodes. ISP colocation systems ("colos") are also considered edge nodes, even though some of them are relatively deep in the network. Given this, programmable servers may be placed in an edge PoP to service nearby clients in an efficient manner. Servers placed in edge PoPs or close to edge PoPs are often called "edge servers".

In this model, the edge server captures the user's request for content and serves the content locally, thereby improving response time, reducing wide-area bandwidth consumption, and relaxing load on the production server. Where the production server is distributed so that multiple servers serve all the clients requesting content, the initial source of the content is often referred to herein as the "origin server" that serves the initial, official copy of the data stream. If the edge is defined as PoP nodes and nodes one hop away from a PoP node, then an edge server is at most one hop away from the nodes where the content is to be delivered. Of course, if the edge is defined to be "thicker" in that nodes more than one hop away, but less than N (N>1) hops away, are in the "edge", then the edge servers might be as far as N hops away from a customer.

If the edge is universally upgraded with servers in this fashion, then Internet services as a whole perform and scale better. Unfortunately, there is no single "edge" of the Internet that can be easily upgraded like this. The edge is owned by a vast array of independent service organizations with different business models and who cooperate only very loosely to provide global Internet connectivity. In current business models, Web content is generally published into the Internet through a hosting facility that is often distributed across the wide-area but not pervasively present across the edge. For example, as shown in FIG. 2, an ISP A owns a piece of the edge while ISP B owns another piece of the edge, so they can cover the whole edge only by working together.

Thus, implicitly, the Web hosting business relies upon edge-caching infrastructure to be deployed throughout the infrastructure to reduce the load on hosting centers and provide quality to users by serving content from the nearby network access points. However, current business models in the Internet do not tend to encourage every service entity to upgrade their edge with quality-enhancing technology like caches and splitters. This is done only when it makes economic sense for the service provider to upgrade, e.g., because the benefits of caching (reducing bandwidth costs and delivering better quality to the customer) outweigh the investment in installing and managing the new infrastructure. Certain ISPs, for instance, have not found this to be the case.

Content providers find enormous value in having access to a serving device in the edge. This is true whether the content provider is a free (e.g., advertiser-supported) service or a paid service (with payment handled through conventional financial channels or using a micropayment system), as the content provider is always better off if their content gets to clients efficiently and correctly.

If the content provider could arrange for their content to be always served from the edge of the network, then the consumers of their content would always receive as-best-as-possible performance from the Internet. Thus, the content provider would likely be willing to pay for such a service as it differentiates their content from their competition's through improved delivery performance and better serves the recipients to which the provider is broadcasting. However, existing Internet caching models do not provide coordinated control over what content is placed at the edge and that edge is owned and controlled by many different ISPs.

1.3. Content Distribution Service Providers (CSPs)

A Content Distribution Service Provider (CSP) is a service organization that sells and provides Internet "content distribution service" to content providers. A CSP might contract with a content provider, such as Yahoo or CNN, to have Yahoo's or CNN's content (e.g., Web pages and streaming media traffic) efficiently replicated and served through the Internet thereby delivering high-quality experiences to recipients of that content. These CSPs typically build their content network by co-locating their servers in traditional ISP networks and redirecting client requests to nearby servers based on various metrics collected about the health of the network and server infrastructure. To effect the redirection system, content URLs often "point into" the CSP's service infrastructure rather than at the original content provider's Internet site. In effect, the CSP can now control what content is placed on its edge servers and provision its infrastructure to be able to serve the content of all of its customers at high levels of performance to arbitrary Internet users.

For the CSP model to work, a centralized entity that owns and controls all of the distributed infrastructure must deploy and manage devices that penetrate the entire edge of the Internet by installing such devices along the edge of every independent ISP, to provide benefits to all recipients regardless of where those recipients' clients are connected to the Internet. However, this is virtually impossible as the Internet continues to grow and evolve. Even if such an entity were able to achieve some degree of success with this sort of global deployment, the resulting business model would be unstable and fragile because the ISPs themselves, who own the physical network infrastructure, will recognize the new business opportunity and, at least some of them, will want to enter the content-distribution market themselves. The result is a scenario in which the very entities that the CSP relies upon to build their service offering effectively become their competitors.

Alternatively, the CSP may offer to allow the ISP to resell the CSP's service under the ISP's own brand, effectively partnering across ISPs to build out a global content-distribution system. Yet, this monolithic approach locks in each ISP to that CSP's content distribution technology. Since the CSP controls how content is distributed and replicated and how clients are routed to content servers, the ISP has no ability to forge its own relationships with other CSPs and/or ISPs. It is likely, then, that this business model will also be fragile and unstable.

2. General Architectures for Content Distribution and Peering

To overcome the fragility of the business models in which an omniscient CSP coordinates the infrastructure of independent ISPs to effect content distribution, a far more stable and scalable business model is the "content peering" model described herein. Content peering eliminates or reduces the role of the CSP and allows ISPs to become the content carriers themselves. In this model, the ISP owns the relationship with the content provider and invests in its own edge server infrastructure to effectively provide high-performance content delivery to recipients of the content of the content providers. But, because each ISP only owns a piece of the overall Internet edge, they must all cooperate, through "content service-level agreements" (CSLAs), to serve each other content from the edge of their own network and provision enough resource on their edge to honor the CSLAs that they enter into with their content peers. That is, two ISPs, A and B, enter into a relationship where ISP A agrees to carry and "serve" ISP B's content customers, and vice versa. In other words, the ISPs enter into bilateral "content peering" relationships. Just as bilateral peering at the IP network layer enables Internet routing, bilateral "content peering" relationships will enable a new form of Internet and Web content routing and broadcast streaming.

With content peering, a CSP is no longer needed to bridge together the existing ISPs' content distribution infrastructure. Instead, the CSP's role would be simplified to one in which it acquired and aggregated content. In turn, the CSP would provide "content feeds" to the ISPs content distribution network through content-peering relationships.

As described herein, a set of ISPs can more easily than before develop their own content distribution service by peering at the "content level" rather than the network level. At the network level, individual packets of data (the content of which is entirely transparent to the network) route from router to router, from source to destination. In some cases, the source is in one network and the destination is in another network. An example would be if (referring to FIG. 2) if a user connected to ISP A at client 12(1) sends a set of packets (e.g., an e-mail message) to a user connected to ISP B at client 12(4). Peering at the network level occurs over a link 29 provided between ISPs A and B, presumably in accordance with a network level peering agreement between A and B. Thus, the packets would route within ISP A to an edge router (not shown) coupled to link 29 and then flow to an edge router (also not shown) at ISP B, where they would be routed to client 12(4). Each router handling the packets has an idea of what direction to send the packets to, so they get on their way, but the routers do not generally know what the data in the packets mean. Since the routers form a network mesh, the routers might reroute a packet around congestion or router failure.

Figure 5:
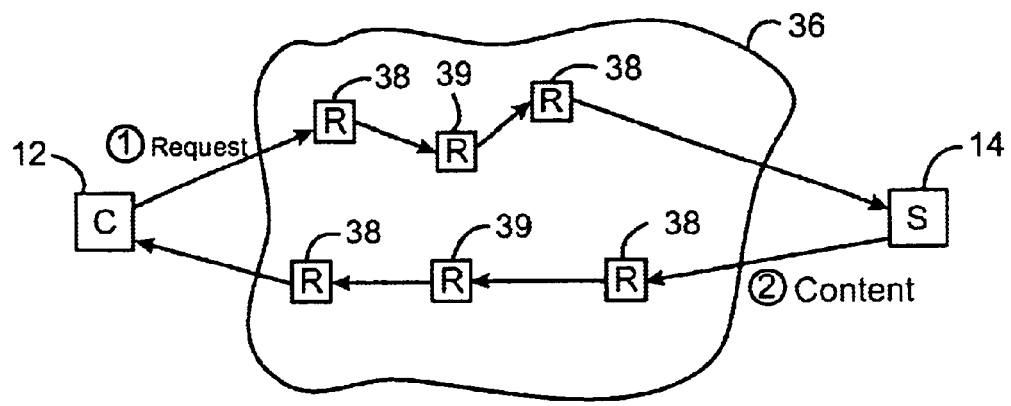
FIG. 5 is a block diagram illustrating the network paths used for a client request for content and a subsequent server response with the content requests.

FIG. 5 is a basic block diagram illustrating the elements of the network involved in a simple client-server request and response. As shown there, client 12 makes a request of server 14 through network 36 and the request flows through an edge router 38, an internal router 39 and another edge router. The response flows through a similar set of routers. For content peering, we add another framework into the mix, referred to in FIG. 6 as the redirection fabric 50. Redirection fabric 50 works with a distribution network 52 and a server array 54 to receive requests and get broadcast content delivered to individual clients. Redirection fabric 50, distribution network 52 and server array 54 operate at a content level rather than at a network layer and thus form an application-level network. To reflect the different levels, FIG. 6 does not necessarily show all of the network layer details. For example, redirection fabric 50 might well include routers to route at the network layer. Redirection fabric 50 and/or server array 54 might also be decentralized and spread over the whole network.

In this framework, the content is "routed" to the clients as content. The content starts at a content server 14 and is injected into network 36 at an injection point 26. From the injection point, the content reaches server array 54 over distribution network 52. Because distribution network 52 is arranged as a network, the content can be scaleably distributed to many servers in server array 54, with congestion or distribution node failure being routed around.

One model for a distribution network is the "overlay routing" approach described in McCanne I. In an overlay network, content can be injected at any attachment point in an overlay network of "service hubs". This overlay network carries content from any injection point, which could be anywhere along an "edge", to servers that are co-located within the network infrastructure and distributed across all the major ISP's, whereby each ISP can manage its own subset of this distribution network and interconnect service hubs through content peering virtual links.

These service hubs initially may be placed in the core of the network, and over time, as the content distribution infrastructure carries more and more traffic, the servers can be incrementally pushed out toward the edge of the IP network enhancing many aspects of network and user-perceived performance. Thus, content can be efficiently carried across the network to servers near the end user which both enhances the quality of the user's experience (because content is delivered quickly with less loss) and the network efficiency (because content is efficiently replicated throughout the network infrastructure reducing the number of copies that are transmitted across congested network peering points and backbone networks).

Figure 6:
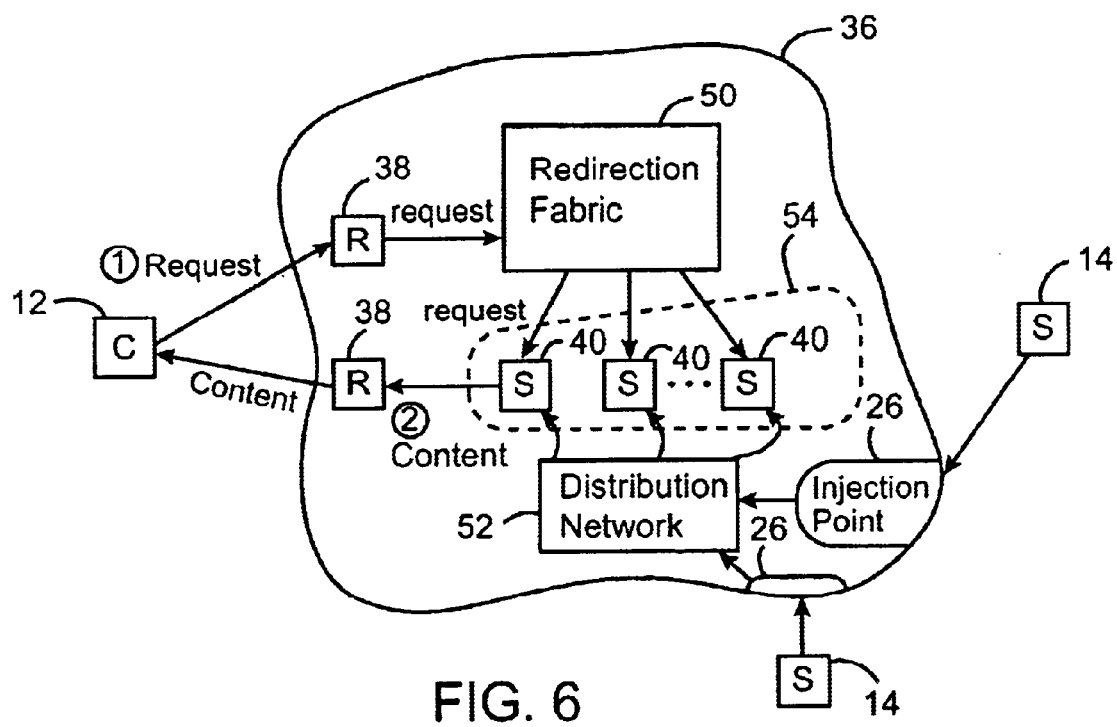
FIG. 6 is a block diagram illustrating the use of a distribution network and a redirection fabric according to one embodiment of the present invention.

Another preferred component of a comprehensive content-distribution model is an efficient mechanism to attach a client to the most appropriate server. As depicted in FIG. 6, a redirection fabric "glues" clients to edge servers to provide the best possible content distribution path. The redirection fabric accounts for client proximity, network path characteristics, server load and utilization, and perhaps most important, policies based on content-peering service-level agreements to best decide how to attach the client to the service infrastructure. For example, when a client clicks on a Web link, the redirection system seamlessly routes that client's request to the best server independent of any client configuration or knowledge.

Figure 7:
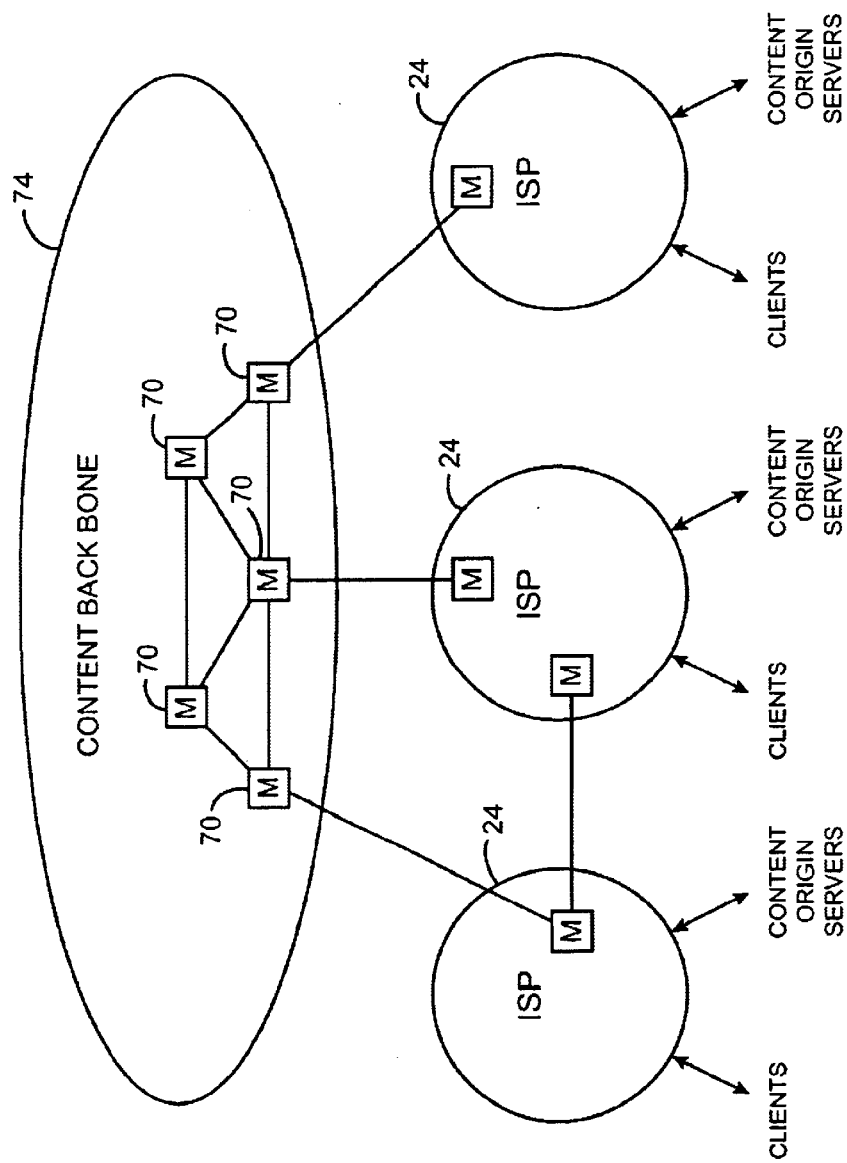
FIG. 7 is a block diagram illustrating a content backbone anchored in a backbone ISP.

To realize this redirection model, URLs produced by the content provider reference not the originating site of the content but instead point abstractly into the redirection fabric (nontransparent redirection). This is accomplished by "anchoring" each content distribution network in one or more ISPs' networks that comprise a virtual "content backbone", as shown in FIG. 7. That is, the content backbone anchors the URL namespace of the content distribution network rooted here using the APAR routing mechanisms described below. The distribution network is built across the content backbone by deploying application-level multicast routing devices within the service hubs in ISP data centers and forming an overlay network by peering these content routers across data centers using "virtual links". Co-located with each content router are one or more content servers that serve live or on-demand streaming media as well as Web content. In essence, the content routers form an intelligent network that connects content injection points to all the edge servers within the content backbone.

Alongside each content router is a redirection node that publishes its presence to the network and indicates, in effect, the URL namespaces that it manages. Thus, when a user application attempts to communicate over the network with the URL in question, some nearby redirector node in the content distribution network intercepts the request. In turn, that redirector node routes the client to the most appropriate server based on load and network measurements that the redirector nodes continually gather in the background. Usually, the best server will reside near the redirector node, but if the local servers are fully loaded the system may redirect a client elsewhere. This redirection can be explicit through a direct communication between the client and the redirection system, but can also be implemented in some cases as an implicit redirection by using the DNS (Domain Name Service) lookup process to redirect clients.

Figure 8:
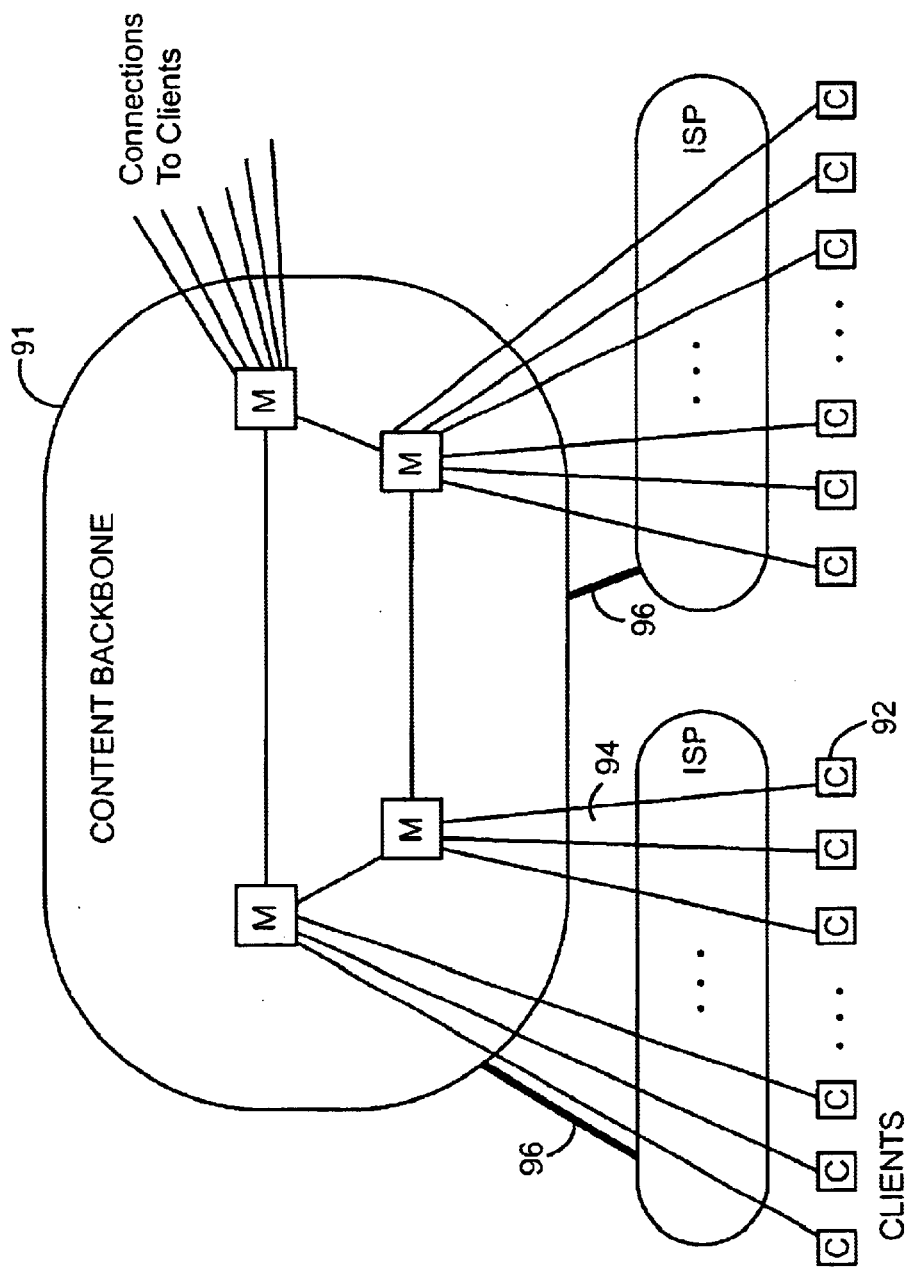
FIG. 8 is network diagram illustrating a highly loaded a content backbone.

FIG. 8 is an illustration of what happens with more and more users access the content backbone. As shown there, a content backbone 91 serves many clients 92 over individual client connections 94 between the content backbone and clients, via ISP's. Also shown is the unicast peering links 96. The peering costs between the backbone network and neighboring ISPs will increase and the delivery quality will ultimately suffer. To avoid this, a peer ISP can build its own content distribution network using the present invention to "peer" with the content backbone to incrementally build out the content network. The content routers in this new deployment would then be configured to capture the URL requests that point into the cooperating content backbone.

Not only does this ISP's deployment of content distribution technology reduce bandwidth costs and provide better network quality to users, but it creates a new revenue opportunity by allowing that ISP to enter into the content distribution service. That is, the second ISP would create and own its own URL namespace anchored in its own content backbone. Then, its affiliate ISPs configure their content redirectors to capture the new URLs, assuming a business relationship exists to support this level of "content peering". In effect, the content distribution architecture described herein allows any ISP to build their own content backbone and content distribution service offering, then peer with one another—at the content level rather than the IP layer—to effect arbitrarily large and wide-reaching content distribution networks.

3. Constructing a Network with Content Peering

In this section, we describe one embodiment of the content-peering architecture outlined above. The system components include:

1) a "federated" redirection system that allows content requests to be routed to servers based on content-peering relationships among ISPs (based, in part, on the teachings of McCanne et al. I and II);

2) a naming system where URLs point into the redirection fabric and contain enough information to allow the service attachment point system to retrieve the content from the content distribution system;

3) a content distribution network comprising application-level content routers that support "wide-area multicasting" of data (as disclosed in McCanne et al. I and II); and 4) server technologies that are enhanced or extended to interoperate with the disclosed content-naming system.

The system components will now be described in further detail.

3.1. Federated Redirection

Content peering preferably uses a redirection system that maps onto the existing peering relationships among ISPs. One approach uses anycasting as part of the redirection process. Anycast routing uses the existing unicast routing infrastructure. Each content backbone is assigned its own anycast address (as the hook to capture content requests). Thus, any ISP can configure their ensemble of redirector nodes with this new anycast address to capture that content backbone's content requests. The content backbone serves as the default autonomous system ("AS") for all requests that do not emanate from or traverse a content-distribution-enabled ISP. Administratively provisioned interdomain anycast routing can be used to make the content backbone span multiple autonomous systems.

As described herein, there are several approaches to redirection. Once such approach uses DNS (Domain Name Service) servers to effect the redirection. Using that approach, DNS servers can be assigned an anycast address and thus fit into the content-peering model. Using N* configuration, an ISP's DNS server can decide to route certain requests to the edge of the ISP and other requests to a main hub and yet other requests to its content peers (depending on the provisioned policies).

One aspect of a scalable and efficient content peering implementation might be a seamless redirection model that accounts for the administrative policies and boundaries of the infrastructure that comprises the content distribution system. In that model, a content distribution network (CDN) is built as a virtual network that spans multiple, perhaps independently administered, sub-CDNs. In effect, this network of CDN networks forms a "Content Internet", since the sub-CDNs are internetworked into one massive CDN.

3.1.1. Administratively Provisioned Interdomain Anycast Routing ("APAR")

Administratively Provisioned Interdomain Anycast Routing ("APAR") refers to a unicast routing technique used in the redirection system. A variation of APAR is described in McCanne et al. II. When APAR is used, each CDN is assigned a small number of anycast addresses. An anycast address is a single unicast IP address shared across multiple distinct physical entities. These distinct physical entities are configured to participate in the unicast routing protocols and the net effect is that packets sent to that anycast address are routed to the nearest device assigned said address.

To extend this approach across the wide area, one or more BGP autonomous systems (AS) are configured to advertise these special anycast addresses. Thus, anycast routing is also carried out at the interdomain level, since BGP will compute the shortest path (constrained by BGP policies) to the multiply-advertised address.

To facilitate the deployment of this approach, a block of unicast addresses could be allocated exclusively for APAR, thus allowing ISPs to easily define policies for these special anycast addresses. For example, IANA might initially allocate a /20 address block (i.e., a block of 4096 IP addresses) to be used for APAR. Thus, an ISP can be sure that the anycast routing state never exceeds 4096 entries (but is likely to be far less in practice because not all addresses will be used and subranges will mostly likely be aggregated). This overcomes a problem where some ISPs use BGP policies to block routes with prefixes longer than 20 bits to avoid the case that some ISP in the Internet floods the BGP routing tables with many unique long-prefixed addresses. Instead, those ISPs can alter their policy to still block such prefixes while only allowing through long-prefix routes that fall within the reserved, well-known APAR anycast address range.

3.1.2. Content Backbone

Each CDN has an associated "content backbone", which is the set of AS's that advertise the anycast address(es) associated with that CDN. Within the content backbone, devices are deployed that are assigned the anycast address (es). Such devices might be Web servers, streaming-media servers, application-specific redirectors, DNS servers, the virtual address of a layer-4 switch load balancer, and so forth. Thus, any packet sent to such an address (whether it is a "stateful" TCP service connection or a "stateless" UDP transaction like DNS) is routed to the nearest instance of anycast-addressed device.

Figure 9:
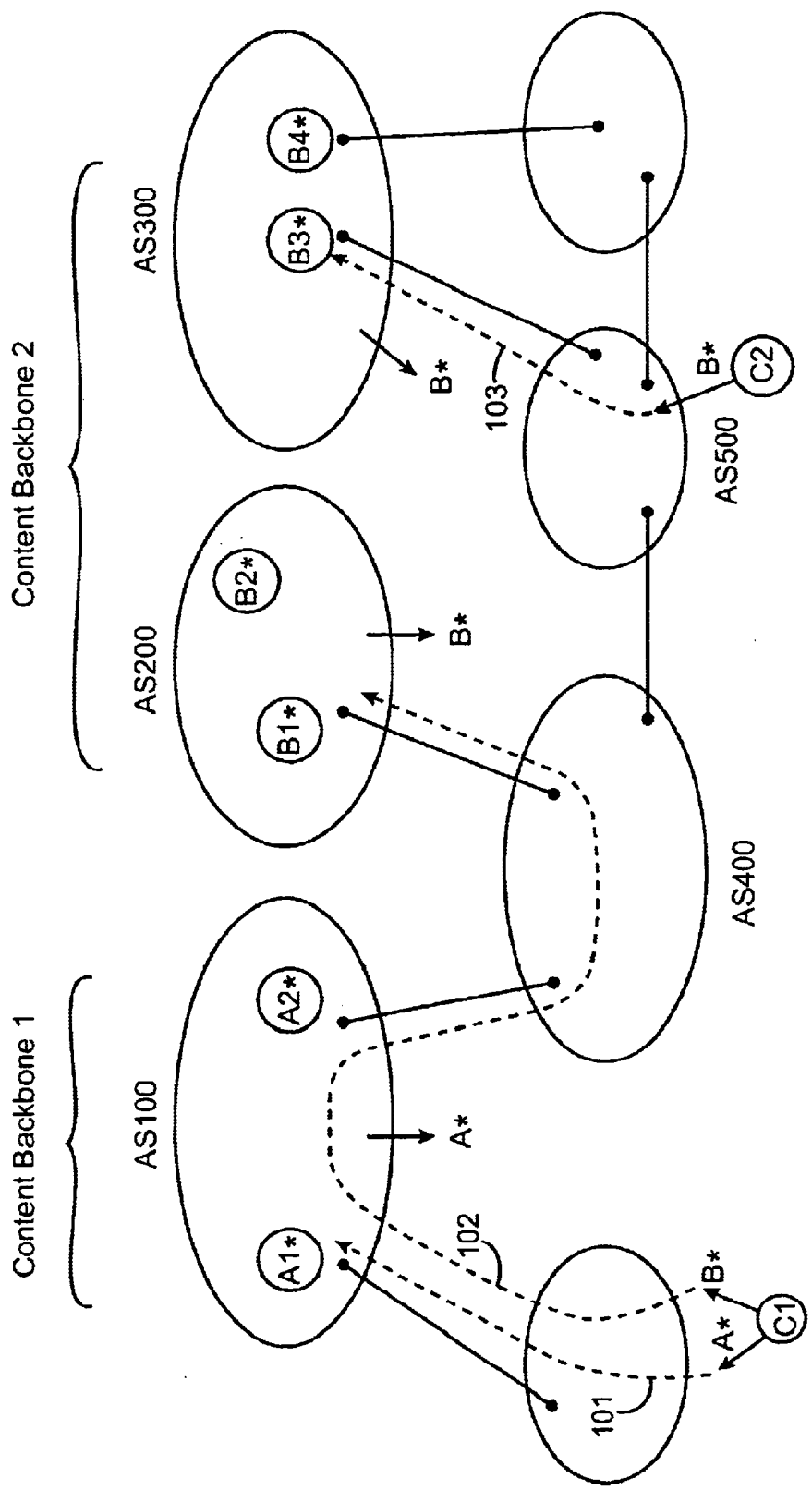
FIG. 9 is a network diagram illustrating peering with APAR anycast redirector nodes.

For example, FIG. 9 shows a configuration where content backbone 1 is deployed in AS 100 using anycast address A*, while content backbone 2 is deployed across AS's 200 and 300 using anycast address B*. As shown in FIG. 9, B* advertises BGP routes. Devices A1* and A2* are assigned the anycast address A* and devices B1*, B2*, B3*, and B4* are assigned the anycast address B*. (Anycast-addressed devices also have a normal unique IP address assigned to them for network management access and so forth. We call this address the management address.) A packet sent to address A* is routed to the closest device in AS 100, whereas a packet sent to B* is routed to either AS 200 or 300 (depending on the BGP route preference). For example, if host Cl sends a packet addressed to A*, it is routed to device A1* along path 101. Likewise if host C1 sends a packet to B*, it is routed to device B1* along path 102. In contrast, if host C2 sends a packet to B*, it is routed to device B3* along path 103.

3.1.3. Anycast Peering Configuration

The CDN system described above may then be extended into other AS's (as described in McCanne et al. II) by creating affiliate relationships between the content backbone and another AS. To do so, the affiliate deploys (or reconfigures its existing) anycast-addressed devices with the anycast address block owned by the content backbone in question. In turn, these devices advertise the corresponding anycast route into the AS's internal gateway routing protocol (IGP), but these routes are not allowed to propagate into the external BGP routes of that AS (otherwise it would be considered part of the content backbone under our terminology). Thus, packets addressed to the anycast destination that originate from hosts within that ISP's network or such packets that transit the ISP's network will be routed to the nearest anycast-addressed device.

Figure 10:
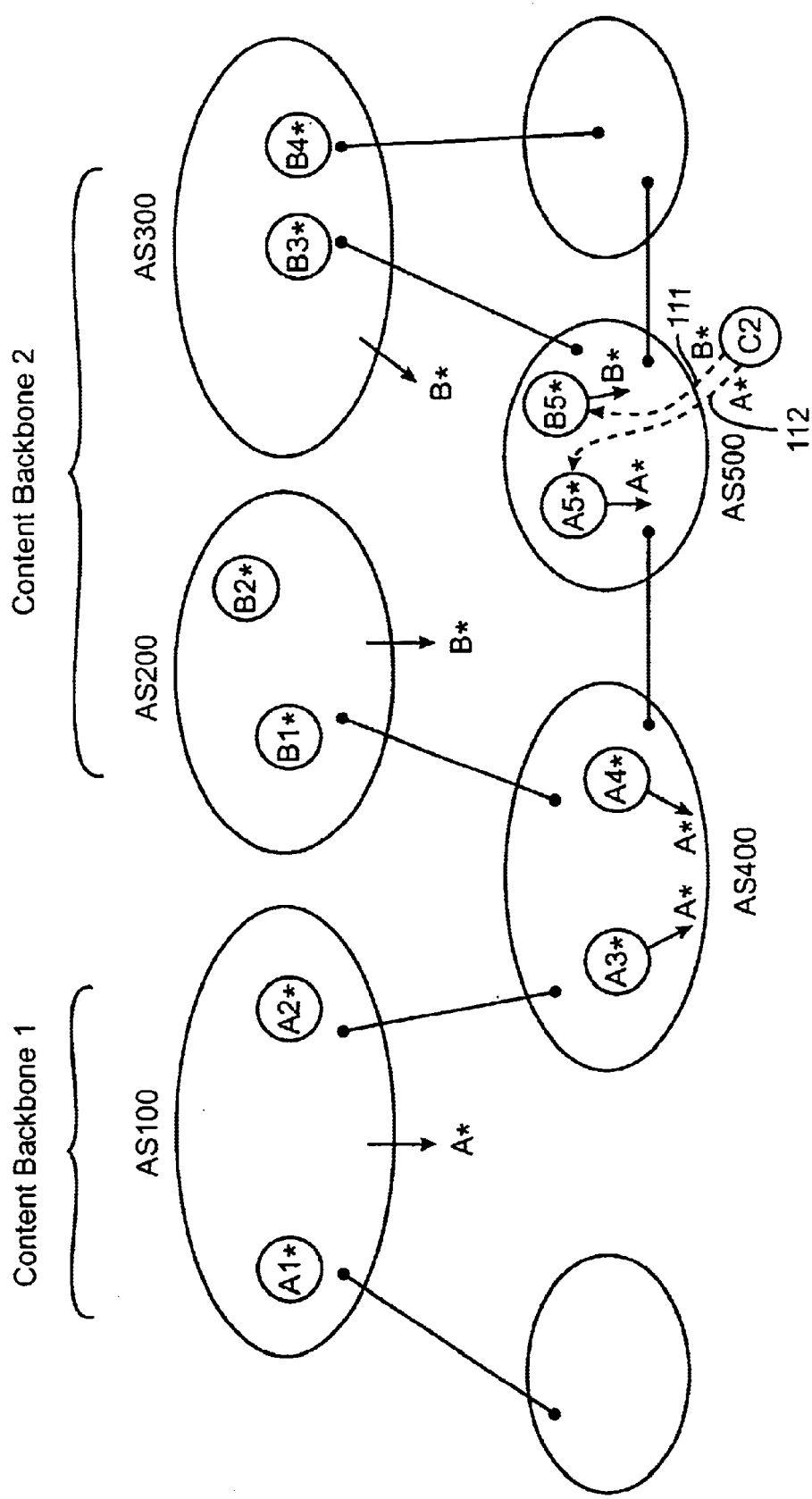
FIG. 10 is a network diagram illustrating the system of FIG. 9 with an additional peering arrangement.

This approach allows the same physical infrastructure and devices to be re-used across multiple independent CDNs. For example, FIG. 10 shows a variation of the layout shown in FIG. 9 altered so that AS 400 becomes an affiliate for Content Backbone 1 and AS 500 becomes an affiliate to both Content Backbone 1 and Content Backbone 2. Here, anycast-address devices in AS 400 are configured to advertise address block A*, while similar devices in AS 500 are configured to advertise both address blocks A* and B*. Now, if client C2 sends a packet to address B*, it is routed to device B5* along path 111. Similarly, if client C2 sends a packet to address A*, it is routed to device A5* along path 112. Thus, AS 500 captures the packets within its domain by virtue of the IGP route thereby avoiding the need to route the request all the way to the content backbone.

Figure 11:
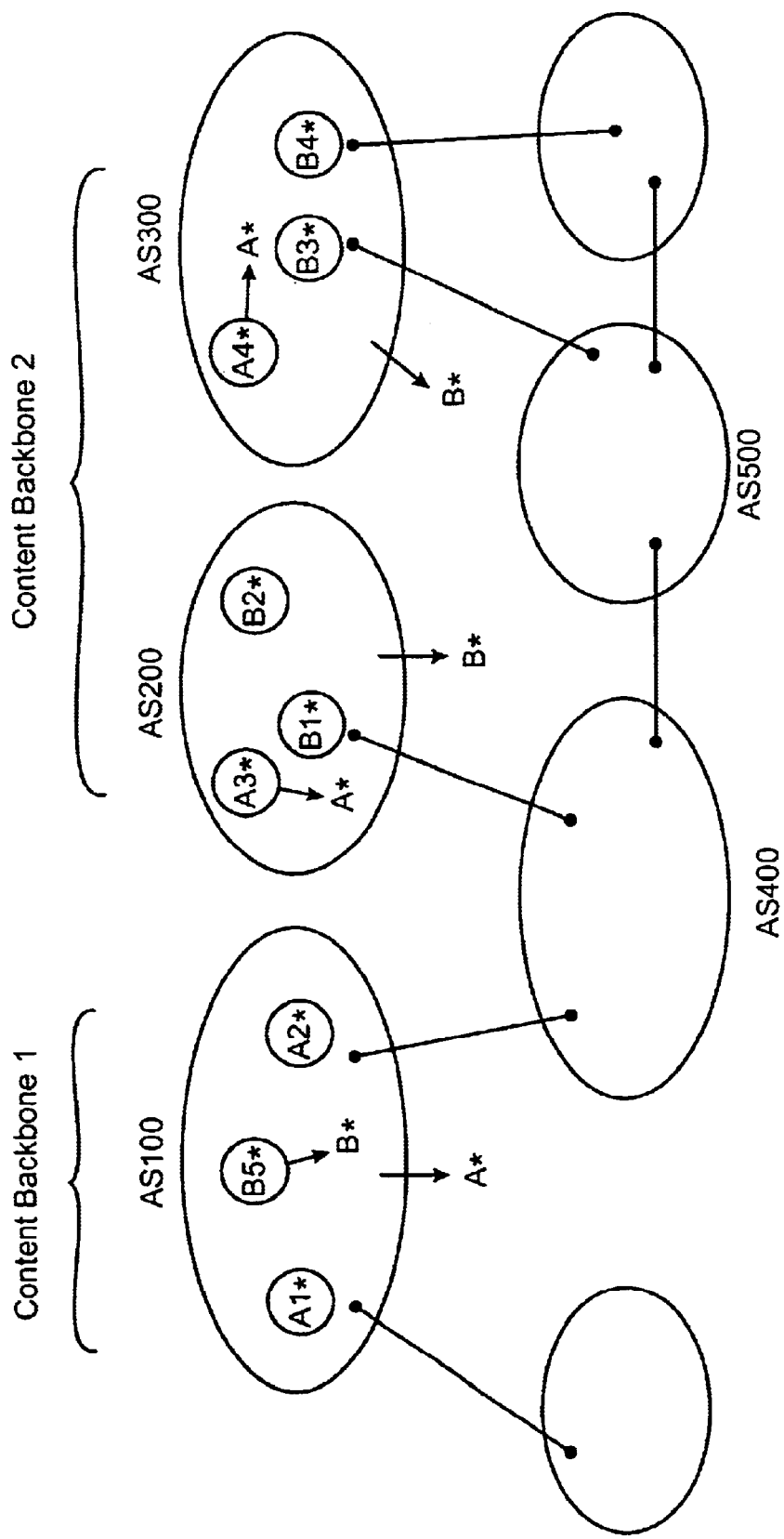
FIG. 11 is a network diagram illustrating mutually affiliated content backbones.

Moreover, the two content backbones can peer with one another, as shown in FIG. 11, wherein they each become an affiliate of the other. Here, AS 100 would be an affiliate for AS 200 and AS 300, and AS 200/300 would become affiliates for AS 100. This is accomplished by deploying anycast-addressed devices B5* in AS 100, A3* in AS 200, and A4* in AS 300 and modifying the IGP of the respective AS's to capture the other content backbone's traffic.

3.1.4. DNS-based Content Peering

The APAR routing system described above can be used to effect one kind of content peering based on specialized DNS servers, which we call herein a "APAR-DNS server". In this model, the APAR-DNS server is configured with one or more APAR anycast addresses and thus appears as a name server on one or more CDNs. In other words, the APAR-DNS server is typically a single piece of physical infrastructure, either owned by the ISP where the device is situated or owned by a third-party that co-locates the equipment in the ISP's network, that supports multiple virtual CDNs that are owned by third party content service providers, or perhaps, by other ISPs.

The CDN backbone then configures the DNS so that some subtree of the DNS namespace is authoritatively managed by the nameserver with an APAR anycast address. In other words, the namespace is managed by the federation of APAR-DNS servers that are configured with that anycast address and function as the authoritative name servers for the DNS subdomains in the subtree. This is accomplished by simply publishing the desired anycast address as a nameserver (NS) DNS resource record for the desired CDN sub-domain (see below).

In prior art, DNS servers map a finite set of configured names onto a finite set of host addresses. Extensive research and product development has generalized this model so that DNS may be used for various sorts of load balancing, Web content replication, and so forth, but in all of these approaches, the input is a name that must be known ahead of time and explicitly configured into the naming system.

Unlike this prior art, the APAR-DNS servers need not be configured with a set of known names that are to be mapped to a candidate set of addresses. Instead, APAR-DNS servers can map an unbounded set of arbitrary names, expressed in a fashion that encodes information about the content request, onto a set of address targets. The targets are configured into the APAR-DNS servers along with attributes that describe their capabilities, administrative constraints, and so forth. The configuration of targets and related attributes can be dynamically modified using an external protocol (an APAR-DNS management protocol).

In addition, policies are programmed into the APAR-DNS servers to control the mapping of named service requests onto targets. To properly load balance requests across the service infrastructure and avoid hot spots of network congestion, server load information and network path characteristics between the APAR-DNS servers at the edge of the network (near the client) and the service infrastructure may be fed into the APAR-DNS server from some external data collection process.

The APAR-DNS server programmatically maps a name-to-address translation request into a target by:

1) parsing the name to determine the meta-information M related to that named service;
2) finding the candidate set of targets in the configured database that match M;
3) pruning the candidate set based on configured policy, server load measurements, and network path measurements;
4) selecting a member of the final set based on additional policy;
5) returning the selected address (or set of addresses) as a DNS A record to satisfy the DNS request (typically with a TTL of 0 so that the entry is used only once).

When using the above process, DNS names can be structured as follows:

<codepoint>.<provider> where <codepoint> defines the meta-information M described above, and <provider> is the DNS sub-domain corresponding to the CDN network. The <codepoint> field conveys information such as application type (e.g., Web, G2 streaming video, stock quotes), the customer (e.g., Yahoo or ESPN), the size of the object, the class of the object, and so forth. This encoding scheme can be generalized in many ways that adheres to the proposed architecture. The <provider> field is simply the DNS sub-domain of the CDN network (e.g., cdn.acme.net). That is, names with the suffix cdn.acme.net are resolved by APAR-DNS servers that choose the most appropriate targets based on externally configured policies and dynamic network and server measurements. Thus, the name of a Web object owned by "ABC" and distributed over the "ACME Networks" CDN might have the structure:

ad102.web.abc.cdn.acme.net

Figure 12:
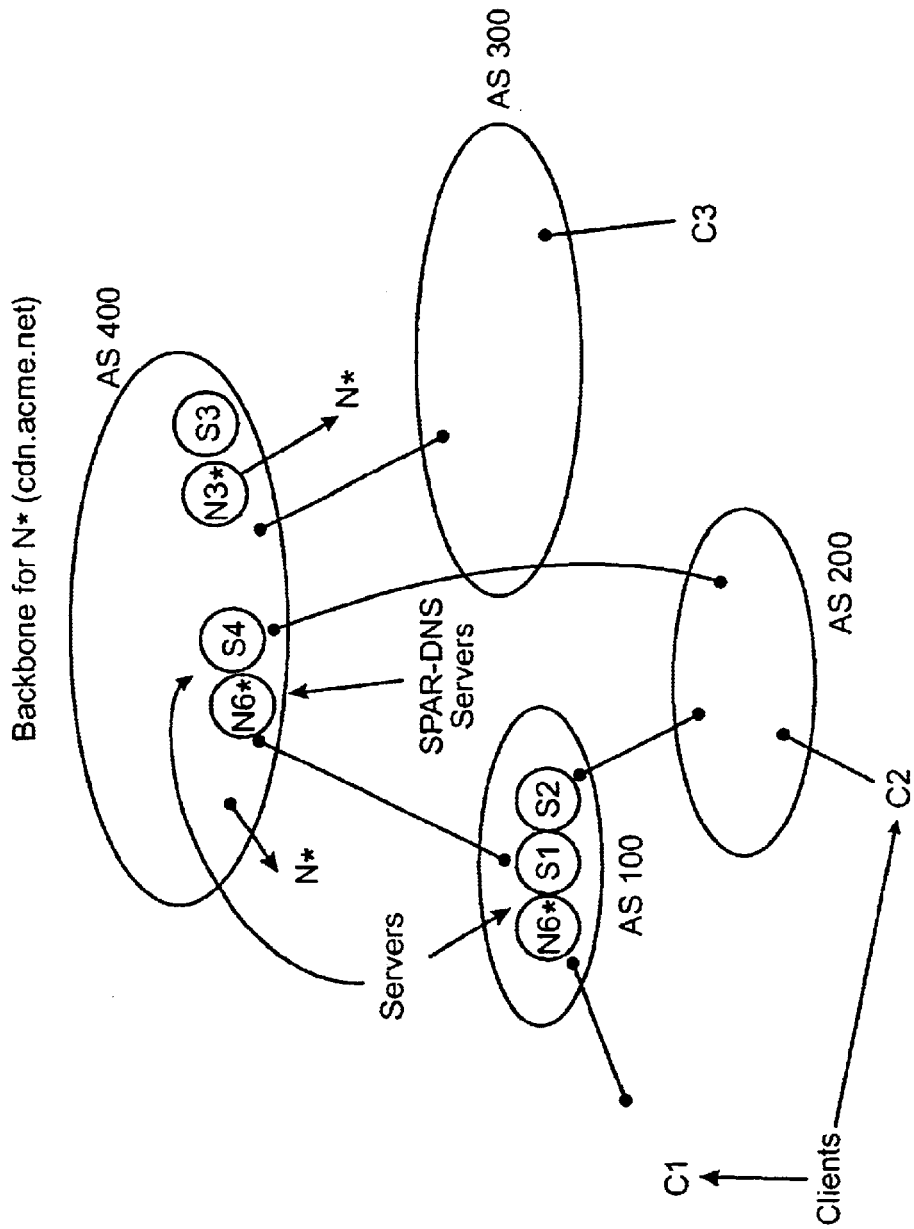
FIG. 12 is a network diagram illustrating an APAR-DNS redirection architecture.

To resolve this name, the DNS query mechanism would learn that cdn.acme.net is handled by an authoritative name server with some APAR anycast address, say N*. Then, when a client went to fetch an object referenced with this name, the DNS query for ad102.web.cdn.acme.net would be sent from that client to N*, causing the request to be routed to the nearest APAR-DNS server configured to handle requests for cdn.acme.net. For example, in FIG. 12, suppose N1*, N2*, and N3* are APAR-DNS servers configured with the APAR anycast address N*. Note that N3* advertises BGP APAR anycast routes (shown by the label N*"). Client C1's DNS request is routed to N1*, while client C3's request is routed to N3*. C2, on the other hand, may be routed to either N1* or N2* depending on whether the BGP route for N* from AS 200 favors AS 400 directly or AS 400 via AS 100, which can be administratively controlled with BGP routing policies.

Within this framework, the different N*'s may be programmed with different policies. For example, N1* may be configured to choose server S1 or S2 for this request since S1 and S2 are near the requesting client. But for other name requests (e.g., ad102.web.nbc.cdn.acme.net), N1* may decide to return server S4, which is farther away and therefore provides potentially lower quality of service. Such a policy would be useful where one customer of the CDN network (in this case, NBC) buys a lower-grade service (compared to ABC for instance). Because the customer information is explicitly encoded in the name, such decisions can be made as part of the DNS lookup process.

To ensure the integrity of the information in a name, the names can include a digital signature embedded in them, where the key used to generate the signature is known only to the name-generating entity (i.e., the customer of the CDN network) and the infrastructure (i.e., the APAR-DNS servers). Thus, a user could not change the nature of its received service by tricking the infrastructure to treat the request with a quality-of-service that was not intended. Likewise, to conceal information conveyed in the name (which may be desirable for the CDN service provider or its customers), the <codepoint> field may be encrypted, also with a secret key.

In addition to customer information, the name might denote a special type of service that is requested. For example, chan4.abc.tv.cdn.acme.net might indicate that the name corresponds to a streaming media channel rather than a static Web object. Thus, when the APAR-DNS server performs the name resolution it would choose a streaming-media server as the target rather than a Web server.

Note that in neither of these cases is the name ad102.web.abc.cdn.acme.net or chan4.abc.tv.cdn.acme.net explicitly configured into the system. Instead, the dependency between names and resources is explicitly broken and targets chosen based on flexible and programmable policies. That is, ABC might create new content entries with new names (e.g., ad103.web.abc.cdn.acme.net) and would not need to explicitly register this name with the CDN. Instead, the CDN would simply react to the new name appropriately upon seeing its first use.

As part of this process, the APAR-DNS servers may maintain state about the location of a piece of content. That is, some external agent may disseminate explicit location information for given objects to optimize the amount of replication that occurs. Or the APAR-DNS servers may simply remember where they have recently directed clients and continue to direct future requests to the same place to avoid creating unnecessarily redundant copies of content (while monitoring the server load and creating copies only when server load warrants).

Figure 13:
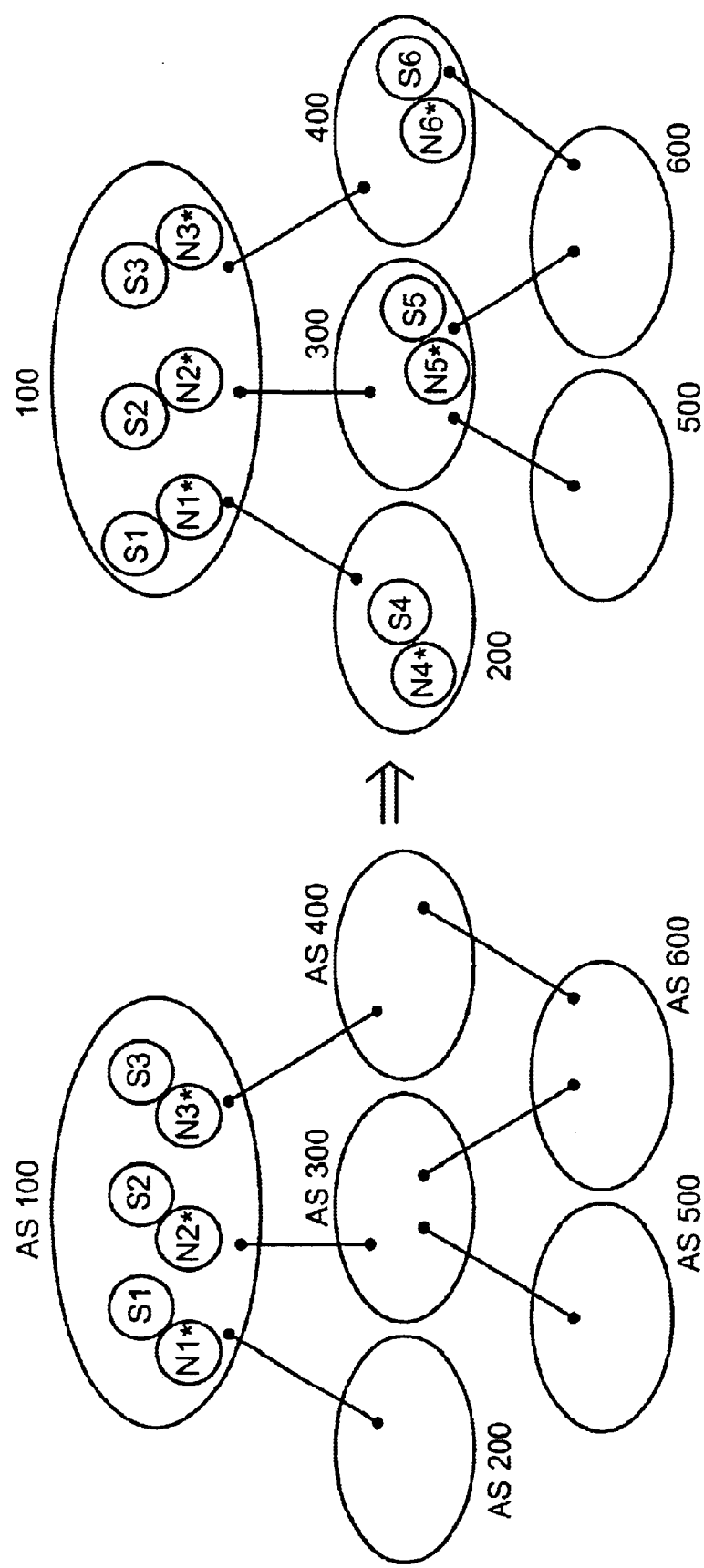
FIG. 13 is a network diagram illustrating incremental deployment of an APAR-DNS redirection architecture.

FIG. 13 illustrates how the APAR-DNS redirection architecture can be incrementally deployed. Initially, N1*, N2*, and N3* are deployed only within the content backbone. Co-located with each APAR-DNS server is a content server (S1, S2, and S3 respectively). Moreover, they are situated near the ISP's peering points thereby allowing the system as a whole to know what the closest peering point is for the client that is requesting the service. Thus, when a client name request arrives at node N2*, for example, that server would preferentially return address S2 for the requested name. However, if S2 were overloaded, N2* could be informed of this (either by querying load on S2 itself, or by being informed of the overload condition by some other agent) and could instead direct clients to alternate servers (e.g., S1 or S3).

Figure 14:
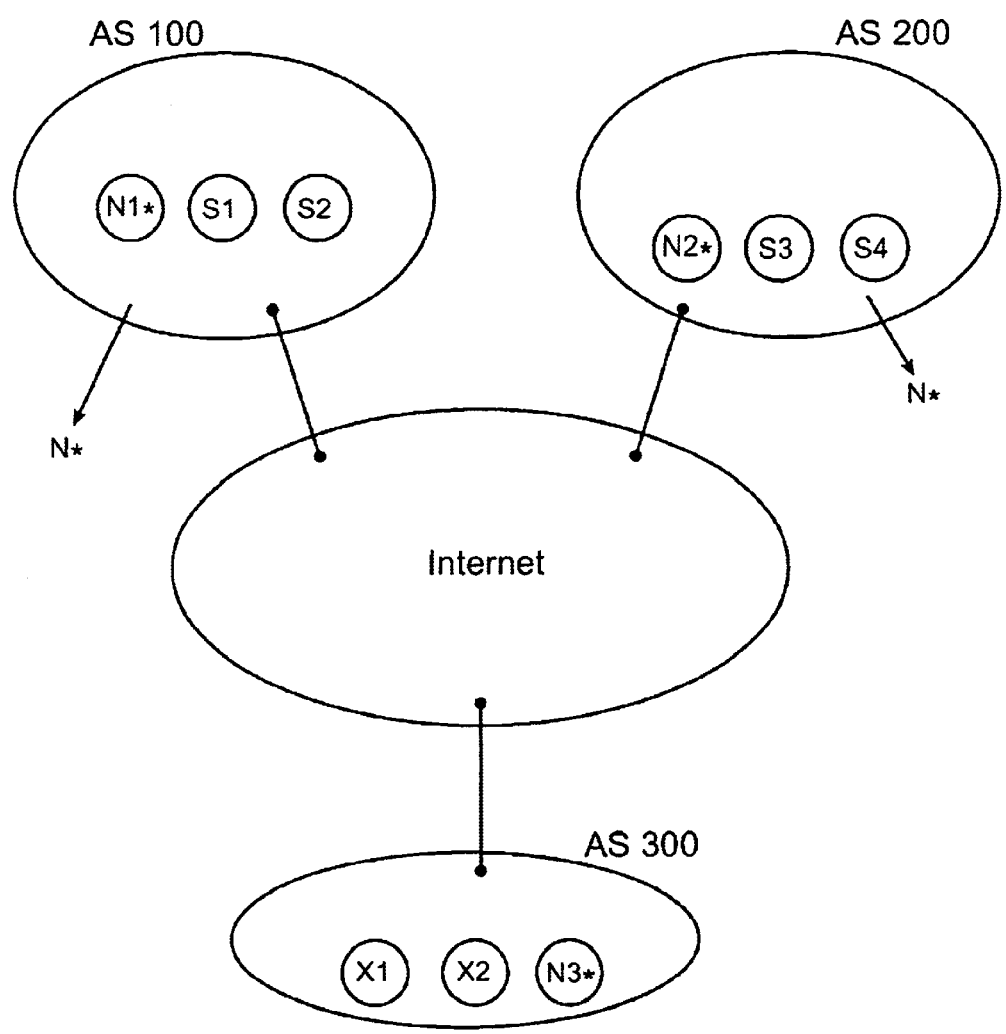
FIG. 14 is a network diagram illustrating incremental deployment of an APAR-DNS redirection architecture where autonomous systems do not have co-located servers.

To aid in incremental deployment, APAR-DNS servers may be deployed in AS's where there are no co-located servers. For example, FIG. 14 shows a configuration where AS 100 and AS 200 comprise the content backbone with servers S1, S2, S3, and S4. AS 300 is an affiliate with no servers. However, N3* may be configured to utilize servers S1, etc and can enhance the quality of service delivered to customers on or downstream of AS 300 by choosing the appropriate server based on dynamic server and network measurements, replication constraints, and configured policy.

Another possibility is for N3* to utilize servers not owned by the CDN in question. Thus, N3* can be configured to prefer servers S1, etc., unless performance degrades, at which point it can decide to divert requests to servers X1, X2, which may be owned by another CDN network or by the ISP that owns AS 300. Because all of this is controlled by policy that follows from content-peering service level agreements, settlement payments can be easily effected to account for the resources that are shared among peering CDNs. Ultimately, the performance of an Internet of CDN networks will be most effective when this technology is universally deployed. In that model, every ISP would enter into CDN peering arrangements and serve and carry content from many different content providers on behalf of many different CDN providers.

3.1.5. Explicit Redirection

DNS servers often cache name-to-address bindings to improve the performance of translation process and reduce bandwidth. However, caching causes the server selection decision to become stale. This may be an acceptable tradeoff to make for the Web, since Web transactions are ephemeral and the system may gracefully adapt to overload on a time scale that is related to the rate at which the cache entry will expire. However, a stale redirection decision is decidedly unacceptable for other types of traffic like streaming media or long-lived file transfers (e.g., large Web objects or music downloads) where a client remains connected to the selected server for a long duration.

While caching can be defeated by using a TTL of 0 in the DNS response message, this could potentially cause an unreasonable performance load on the DNS system unless APAR-DNS servers are universally deployed, which is not expected in the initial roll-out of such systems. Some ISP's configure their DNS servers to ignore the TTL field, so it might not be possible to entirely avoid caching. Even if caching is avoided, using non-cacheable DNS responses will worsen the overall response time of Web transfers since the DNS translation step can often be substantial fraction of the overall Web transaction (especially for small Web objects), and this prevents the DNS server near the requesting client from caching the translation step for other clients. Thus, it is important to use DNS record caching to achieve good overall performance of a CDN, but might result in the use of stale data.

Suppose the APAR-DNS server chooses some streaming media server S to handle a particular streaming-media feed and thus returns it. Further suppose that response is cacheable for one minute. Now consider the case where 5000 clients all happen to request that same feed in the next minute. Since the mapping for S is cached in the normal DNS system (which is unaware of the CDN), S will be the target of 5000 client connections. If this exceeds the capacity of that server, then client performance will degrade or the clients' connections will be rejected.

To overcome this problem, explicit redirection could be used in place of (or in combination with) DNS-based redirection. Here, redirection modules are deployed as anycast-addressable devices, just as the APAR-DNS servers were deployed above. An application-specific connection request (e.g., via HTTP or RTSP) is then sent from the client to an anycast address, which then redirects the client to an appropriate server. In this case, an explicit redirection step is always involved avoiding the staleness of cached DNS bindings. That is, a redirector can continually monitor the server infrastructure and change its redirection behavior immediately to reflect changes in load or network path characteristics. This process is disclosed in depth in McCanne et al. II.

Explicit redirection can be combined with APAR-DNS redirection to achieve the best of both approaches. In the description below, we assume an APAR-DNS system is already deployed. If such a system is deployed, rather than return a DNS mapping to a specific server, the APAR-DNS server could return a mapping to an explicit redirector that does fine-grained server-monitoring and load balancing.

Figure 15:
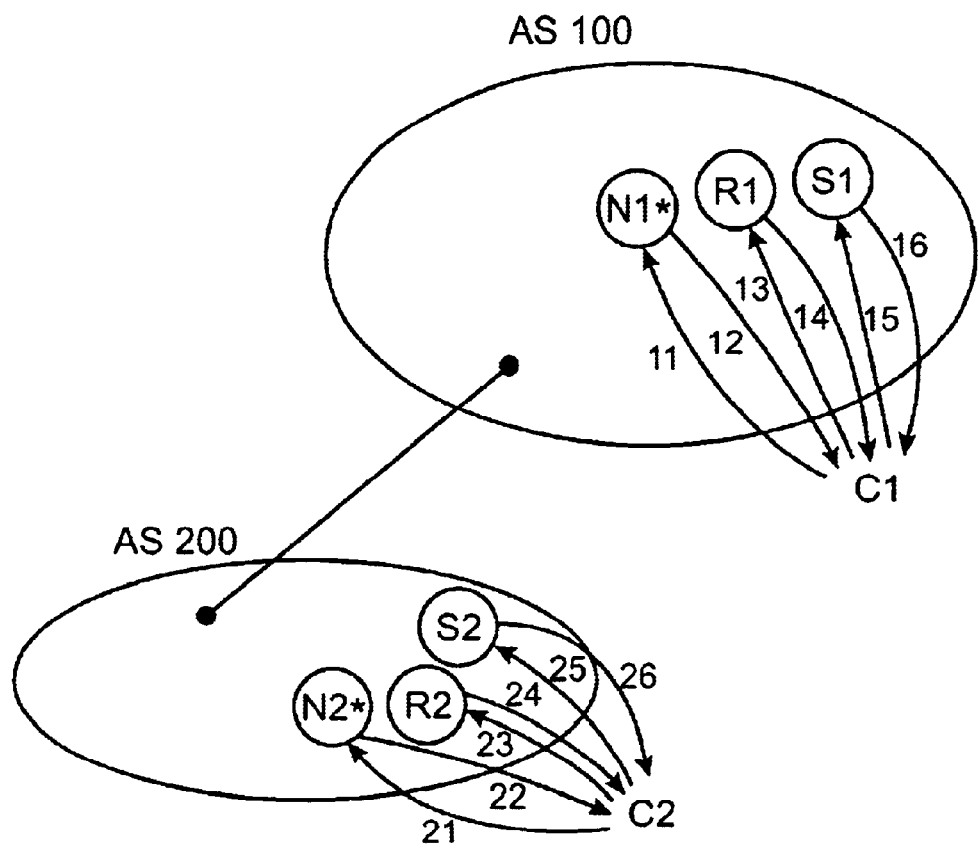
FIG. 15 is a network diagram illustrating explicit redirection.

FIG. 15 illustrates this configuration. Here the same streaming media request is served from server S2 to client C2 in AS200, but from server S1 to client C1 in AS100. In the former case, client C2 performs a DNS query on the service name, which is routed to APAR-DNS server N2* via address N* (path 21). N2* parses the service request and decides, based on configured policy, that redirector R2 can provide the requested service and thus returns an A record for R2's address in response to the original request (path 22). Client C2 then invokes an application-specific connection (e.g., HTTP) to R2 (path 23) which responds with a message (path 24) that directs the client to create a streaming-media request (e.g., via RTSP) to server S2. Note that the redirector R2 would be configured with its own set of policies and potential target servers for directing clients accordingly. Similar steps would be taken for client C1, as shown by paths 11–16.

Figure 16:
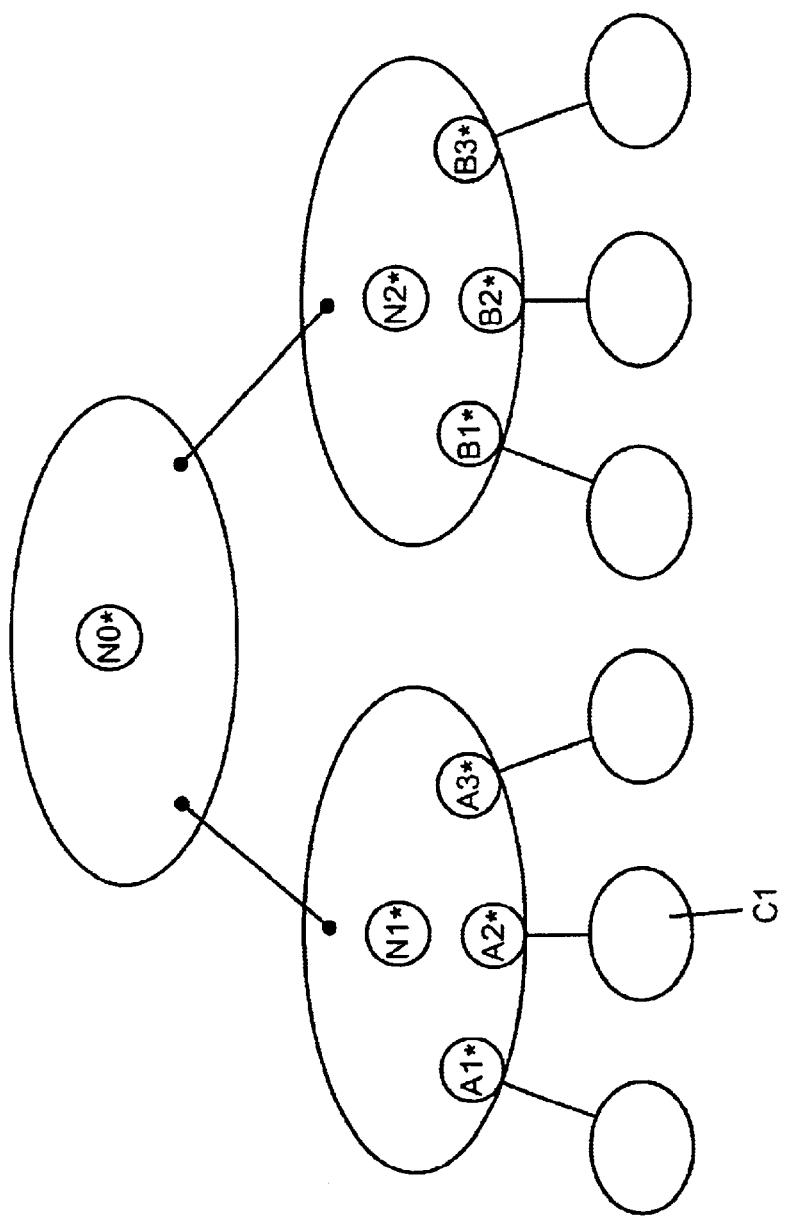
FIG. 16 is a network diagram of a network where explicit redirectors are deployed across the edges of autonomous systems.

Alternatively, the APAR-DNS server could return an APAR anycast address of a set of redirectors. This would allow a scenario in which one APAR-DNS server was deployed in the core of an AS, while a number of explicit redirectors were deployed across the edge, as depicted in FIG. 16. Here, N1* is configured to return an address A* (which is assigned to A1* . . . A3*) in response to streaming media requests. Then, a client request, say from C1, would be routed to the nearest explicit redirector, in this case, A2*. A2* would then decide how to explicitly redirect the client as described above. A similar process is carried out for the network that contains N2*.

3.2. Content Distribution Naming System

Normal URLs that point to the content servers (the origin servers) cannot always be "captured" by a redirector. For example, if a client makes a request using a URL that points into the redirection fabric, the redirection fabric doesn't immediately know the origin for the request (because the origin address is replaced with an anycast address). Thus, a better approach is to include additional information in the URL that can be used to identify how to locate the content, who the customer is, and so forth.

In the Web architecture, a Web object's name is decomposed into a server name and a path on that server expressed most commonly as a URL. However, the redirection system described above relies upon mapping the server name of the Web object (or content request in general) to an arbitrary service node within the network infrastructure. Thus, the server name might no longer uniquely identify the content in question.

To overcome this problem, the typical redirection systems used by others that obfuscate the server address in this fashion recover the original intent of the Web naming system by embedding additional content-naming information into the path component of the URL. For example, a Web object conventionally referred to as http://www.foo.com/index.html could be referred to as follows with respect to the CDN:

http://foo.cdn.acme.net/www.foo.com/index.html

This representation then allows the ACME networks CDN redirection system to route client requests for this object to some arbitrary server in the CDN. Upon receiving the request that server would be able to pull the content from the origin server at www.foo.com. Of course, this approach can be generalized to embed arbitrary content routing and policy information in the referring URL.

A better approach, which provides a higher degree of flexibility, is to add a level of indirection where the URL contains the name or address of a server that provides arbitrary information as to how the content request should be handled. For example, a service request for a live broadcast could be represented with the following URL http://foo.cdn.acme.net/cdn.foo.com/Channel12

Here, cdn foo.com points to a server that manages the information base for how content requests should be handled. The service node that receives this request could contact cdn.foo.com to query it as to how the "Channel12" content request should be serviced. That server could then respond with a message that tells the service node to join a particular application-level multicast channel to receive the broadcast (see below) or alternatively to pull a cascaded feed from a streaming-media server elsewhere in the network. By adding this level of indirection, an arbitrary amount of content meta-information could be associated with a URL without having to place this information specifically in the content provider's URLs. Also, this meta-information can be changed dynamically, e.g., to alter the way a broadcast is distributed based on congestion or network outages. Finally, the performance of this directory system could be optimized by caching results and/or disseminating the information across the application-level multicast network that might form an integral part of the CDN offering in the first place.

3.3. Content Distribution via Application-level Routing

Application-level multicast routing can be used to deliver live content and to induce a caching hierarchy for on-demand driven content replication. Application-level multicast routing can also be used to disseminate content routing polices, server load information, replication information, and so forth to the redirectors (i.e., the redirectors join an application level multicast group to learn about how they should be doing their redirection).

The techniques above for client redirection refer to servers generically, but in a CDN, the servers typically act in concert with other elements in the network to bridge content from the publishing sites across the network to the CDN servers. As such, a more powerful model is to cast the servers as access points to an application-level content network as described in McCanne et al. I. In this model, the client requests are routed to service node attachment points based on server load measurements, network path characteristics, administrative locality, customer policies, and so forth. Content is routed across an application-level network of content routers. Additional layers of naming and addressing may be implemented to overlay this content network onto the underlying Internet.

When a client requests service, for example, the request (expressed as a Web URL) contains enough information to properly request the content from the application-level content routers as described above. For a live streaming media broadcast, for example, the service attachment point will need to retrieve the broadcast from the distribution network in a fashion that allows the system to scale with the number of access points. To achieve this, a distribution network is interposed between the broadcast injection points at the service attachment points. Rather than rely upon a globally deployed "multicast" network service, the system described herein instead re-uses the service infrastructure to bridge together service hubs across the wide area into an "overlay network". This overlay computes multicast routes at the application-layer that efficiently splits and replicates live flows across the wide area from every injection point to every service attachment point based on a subscription model. A network-layer (native) multicast may be used recursively by the application-level content distribution system as an optimization where available.

An application-level multicast network is not only useful for routing live content across the wide area, but it also can be used to route on-demand Web and streaming-media traffic asynchronously. In this model, a multicast route from an injection point to all edge locations induces a caching hierarchy, where a cache miss is routed up the tree toward its publishing site. That is, when a cache (E) at the edge of the network needs to fetch a piece of content, say from some source (S), that edge device consults the application-level multicast route for the spanning tree rooted at S. This route indicates the parent node (P) in the tree on the path back toward S and the edge device in turn sends the content request to P. Then, P consults its cache to see if the content is present, and if so, delivers the content along the tree back to E, where each node along the reverse path stores a copy of the requested content. If the content was not present at P, P propagates the request up the tree according to the multicast route, and so on. This dissemination model scales nicely because each node in the tree requests a given content item at most once, but over time, the entire edge of the network becomes populated with the content.

Alternatively, the multicast mechanism can be used to "pre-fill" caches at the edge of the network, using hop-by-hop reliable multicast. (In contrast to network-layer multicast, an application-level service infrastructure allows richer forms of reliability to be implemented on a hop-by-hop basis.) Here, certain caches at the edge of network belong to one or more application-level multicast groups. At the content origination site, new content updates are published onto a group, which is reliably disseminated to all the caches that have subscribed to that group. In addition, the redirection system is informed of the cache updates so that clients are redirected to caches that have the requested content. Thus content changes or additions are efficiently disseminated to large portions of the edge caches using application level multicast.

One of the elements of an effective contribution system is the efficient exchange of information across the various components that comprise the overall system, e.g., disseminating server load information to redirectors, content replication decisions across the system, network path measurements, and so forth. To this end, the application-level multicast content distribution mechanisms could be re-used to distribute this meta-information across the system components. For example, all the redirectors within a "domain" might subscribe to a common multicast group and exchange load information across that group. Likewise, when a system eliminate decides to replicate a piece of "active" content to another server, that replication event could be made known to all the redirectors by publishing the event over the multicast infrastructure. In turn, the redirectors could then direct clients to the new copy of the content.

3.4. Enhanced Server Capabilities

As shown in FIG. 4 et seq., servers 40 are embedded in infrastructure 16, and those servers 40 are fed by distribution network 52 (shown in FIG. 6) and redirection fabric 50 redirects clients to edge servers. If the URL conventions described above are used, such as making a reference in a way that the redirection fabric can deduce the origin, then a conventional web cache or streaming media server might not be able to pull down the original content. Thus, these servers are extended with simple rules for how to resolve the content request via the conventions in the URL. For example, a redirection-aware Web cache would parse the URL path and determine that it should go to a particular Web server in the network to pull down the content. Alternatively, the cache may consult a database (through another anycast-type directory system) that tells it where to fetch the content from or the cache may be configured to pull the content from the content network, e.g., by making the content router look like its parent Web cache and serving the request by pulling the content across the application-level content network.

Another example is live content like streaming media. Here, the edge server could parse the URL to find the streaming-media "channel information", which might be an application-level multicast group. To receive the live broadcast, the edge server would subscribe to the application-level multicast group using the techniques described in McCanne et al. I.

One of the challenges imposed by the CDN architecture described herein is that the DNS system is re-used to perform client redirection, thereby causing the original location of the content to be lost. To overcome this, additional content identification information can be carried elsewhere, e.g., by embedding it in the URL as described earlier. The downside of this approach is that devices that rely upon the conventional URL semantics fail to work, e.g., a Web cache cannot fetch the original content from the host address specified in the URL.

To deal with this, legacy devices must either be configured such that they can offload this problem onto a "CDN-aware" component, or they must be altered to conform to the new architecture. In the former approach, for instance, a Web cache might be configured to utilize a CDN-aware content router as its parent using the Internet Caching Protocol (ICP), a scheme that virtually all commercial caches support. When such a cache receives a content request for content not already in the cache, it passes the request to the ICP parent, which could respond with the data in question by interpreting the modified URL, pulling the content across the CDN network, and returning the fetched data to the requesting cache.

Alternatively, existing server technology can be extended with rules for how to resolve the content request via the conventions in the URL. That is, a new URL format could be defined such that web caches could recognize the special format and handle the request according to the new semantics, e.g., on a miss, the cache fetches the content from the server location embedded in the URL. Or, the cache could be extended with protocols that conform to the CDN network and could directly fetch the content across the CDN. Similarly, for live content, a modified streaming-media server could subscribe to a broadcast by joining an application-level multicast group that is either embedded in the URL or retrieved from a directory using meta-information encoded in the URL.

4. Client-Driven Service Rendezvous (CDSR)

4.1. General CDSR Architectures

While the DNS-based redirection and explicit redirection schemes described above provide viable approaches to content peering based on APAR routing, they also have some limitations. In the DNS approach, for example, users often misconfigure their hosts to use DNS servers that are in other service provider networks either accidentally (e.g., because they change providers without updating their DNS server address) or deliberately (e.g., because their provider's DNS system exhibits poor performance). Even when a host is properly configured with the topologically nearest DNS server, the accuracy of DNS-based redirection is only as good as the granularity of coverage of DNS servers. For example, an ISP may deploy just one DNS server for its entire autonomous system. In this case, all redirection decisions for all the customers of that ISP will be performed with respect to that one DNS server. Moreover, DNS servers often cache name-translation results even when the DNS response packet indicates a time-to-live value of 0. Thus, when responding to a service request, an APAR DNS server cannot ensure that only one client will attach to the chosen server for a given redirection transaction. Because of this, the number of clients that attempt communication with that server cannot be easily controlled. Finally, clients often cache name-to-address translations within the application itself since they assume that DNS provides a stable, (almost) static mapping from names to addresses. In this case, if a server fails and the client attempts to contact the failed server, the redirection system has no opportunity to return an alternative address for the failed server.

The explicit redirection process is computationally and memory intensive (compared to transactional redirection like the APAR DNS approach) because it involves establishing a TCP connection, assembling the request message from arbitrary TCP packets, parsing the application-level protocols that comprise the request message, responding with a properly formed redirection message, and closing down the connection. In contrast, a transactional redirection system involves merely receiving a single request packet, parsing its contents, and responding with a single reply packet. There is no pending connection state or protocol processing that must occur across a sequence of packets. Moreover, explicit redirection is based on somewhat cumbersome application specific protocols that are inflexible in terms of their scope of use. For example, once the redirector directs a client to a particular server, that client-server relationship is fixed. Thus if the server fails or the network path between the client and server suffers performance problems or failure, then the client has no recourse to reconnect to an alternate site because the redirection system is no longer involved in the server-client communication.

To overcome these problems, redirection can be recast as a core and fundamental piece of the Internet infrastructure just as the DNS system is a core and ubiquitous part of the Internet. With DNS, every host on the Internet includes logic and configuration state that allows any Internet host to interact dynamically with the infrastructure to perform name-to-address translations. That is, a host is configured with the IP address of a DNS server, which performs name translations on behalf of that client—the client interacts with intelligent agents (i.e., name servers) in the infrastructure to obtain this service.

Figure 17:
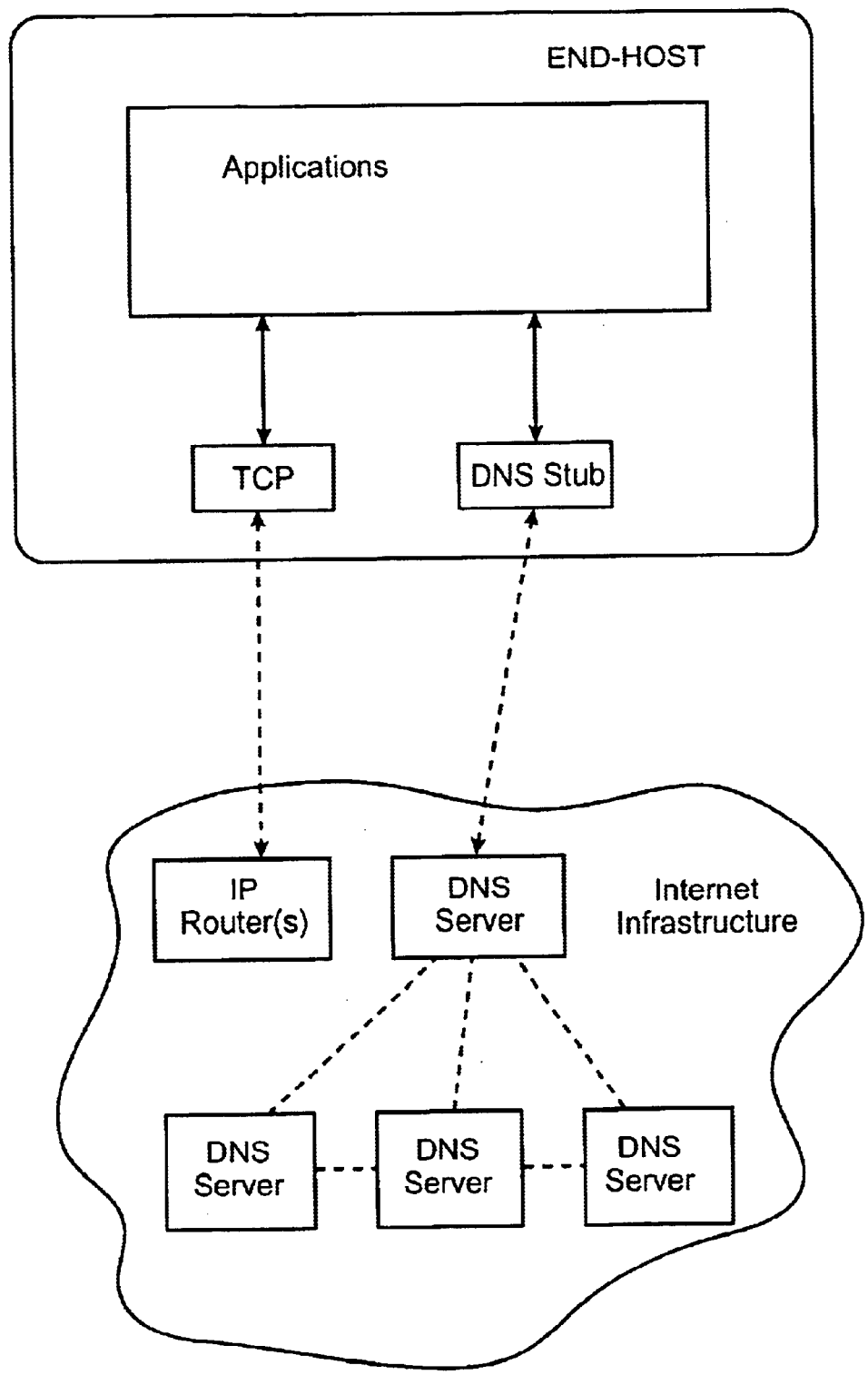
FIG. 17 illustrates a conventional DNS architecture.

FIG. 17 illustrates this architecture. Here, applications invoke a stub resolver on the end-host that in turn interacts with DNS server agents in the network infrastructure. All of these agents use the underlying IP packet forwarding service to intercommunicate.

Figure 18:
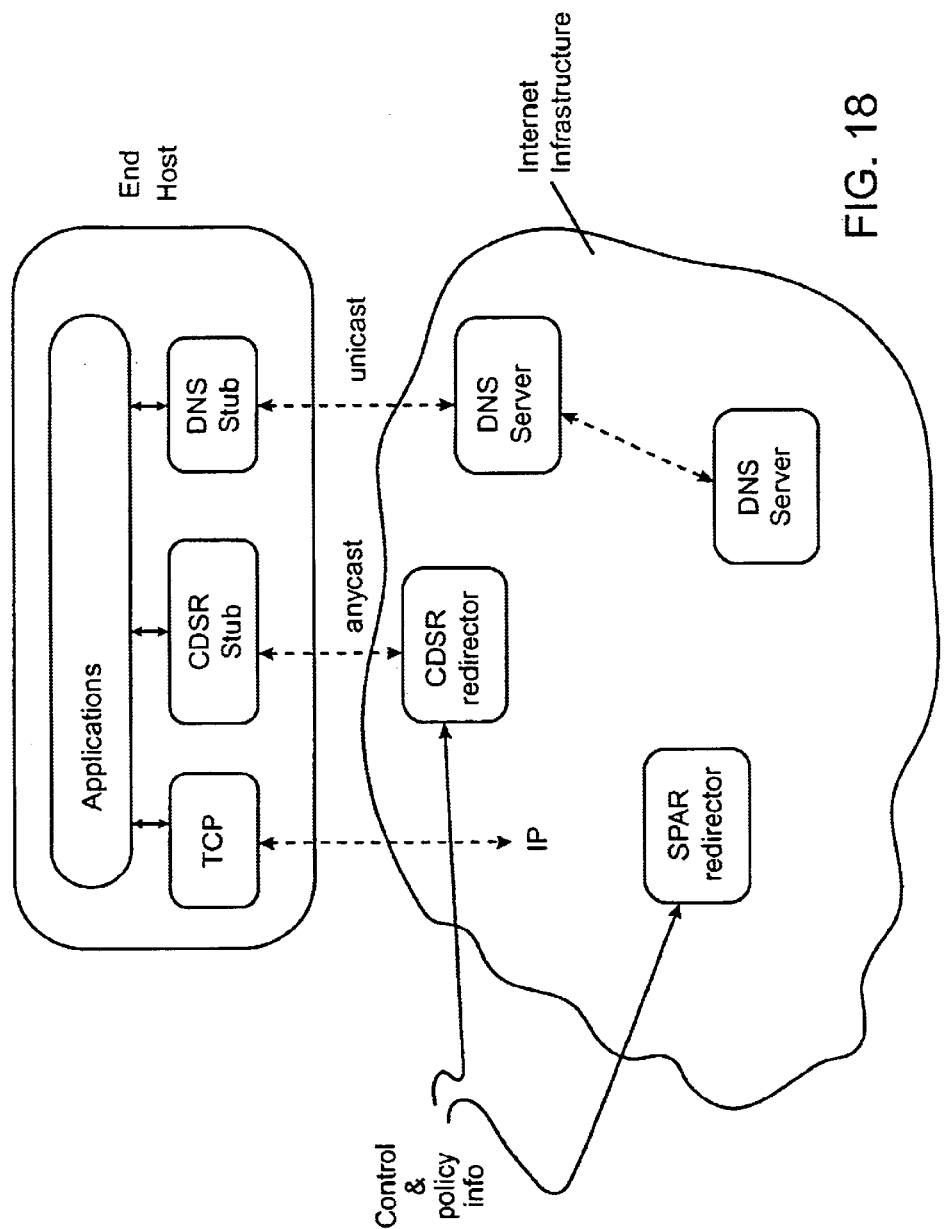
FIG. 18 illustrates an CDSR architecture as extensions to an existing end-host architecture and TCP/IP Internet architecture.

A ubiquitous redirection system can be built according to the same philosophy as depicted in FIG. 18. In this model, applications interact directly with a redirection stub that runs natively on the end-host. In turn, this redirection stub communicates with intelligent agents in the network infrastructure to carry out explicit redirection functions on behalf of the client. Because a new interface to the redirection system is created and applications are specifically designed to interact with this subsystem, the problems associated with transparent forms of redirection are eliminated. For example, applications can include specific logic to reinstantiate service connections to failed or faulty servers. This approach to redirection is called "client-driven service rendezvous" (CDSR) since the end client is actively involved in the redirection process.

When built upon the APAR routing system described earlier, CDSR provides a scalable and incrementally deployable framework for large-scale content peering in which different service providers own and operate different pieces of the physical infrastructure to enter into peering arrangements at the content level. In this model, the APAR routing system described earlier can be used to effect content peering using a client-driven redirection agent, which we call herein a CDSR redirector. Here, a CDSR redirector is configured with one or more APAR anycast addresses. As with APAR-DNS, the CDSR redirector is a single piece of physical infrastructure, either owned by the ISP where the device is situated or by a third-party that collocates the equipment in the ISP's network, that supports multiple virtual CDNs that are owned by third party content service providers, or perhaps, by other ISPs.

To support CDSR redirection, client applications are modified to interact directly with the redirection system by invoking a redirection stub on the local host. This stub in turn communicates via APAR anycast routing with CDSR redirectors in the network infrastructure. This dialogue occurs as a simple, single-packet request-response interaction so that the transaction is stateless and thereby avoids problems associated with route flaps (i.e., where a route flap causes a sequence of anycast packets to be routed to distinct physical hosts, which would otherwise disrupt a stateful transaction).

There are many possible ways that a client might perform this service rendezvous task, but one such mechanism could build upon the widely accepted method of referring to content resources and services with URLs. In current art, an application like a Web browser or streaming media player parses a URL into a server component and relative path component. The server component is typically resolved with the DNS system to the IP address of the server. The application then initiates a TCP connection to that server and issues a request for the object indicated by the relative path component using an application-level protocol like HTTP or RTSP. The object is then received or streamed over the connection to the client or over an adjunct connection that is created as a side effect of the original transaction.

Under CDSR, the client uses an alternative approach. Rather than parsing the URL into server and path components and initiating a connection to the server, the client presents the entire URL to the CDSR stub, which in turn, sends a service request packet to the nearest CDSR redirector in the network infrastructure. The nearest redirector is located implicitly through the use of APAR anycast routing. That is, the packet is sent to some anycast address, say A*, associated with the CDN backbone that hosts the content referenced by the URL in question. There are many possible methods for obtaining the address A*, but one such method would be to embed the address in the URL according to well-known conventions, e.g., as part of the path or as the server address.

For example, a URL that referred to a news feed (called "news.rm") available on "any" node on the ACME Networks CDN could have the following form:

rtsp://any.cdn.acme.net/news.rm

Here, the client would inspect the host component of the URL "any.cdn.acme.net" and determine through some mechanism that this URL refers to a CDN backbone rather than a specific server. There are many possibilities for making this determination, but one such mechanism would be to define a well-known set of IP address to serve as APAR anycast addresses. For example, IANA may set aside a special range of unicast addresses from the IP address space specifically intended for APAR anycast routing. Or, a static set of addresses may be allocated by various service providers and configured into the end-host applications either through static compilation or by dynamic download updates across the Internet. With these conventions, the client could directly infer by inspection of the address that it should use the CDSR system for service rendezvous rather than the conventional methods. Alternatively, the DNS might include a special attribute that indicates that a particular DNS subdomain is managed by the CDSR system.

Continuing the example, suppose any.cdn.acme.net resolves to the IP address A*. Then, the client sends a CDSR request packet over UDP with the IP address A* as in the destination address field of the IP header. As a result, the request packet is routed to the topologically nearest CDSR redirector, which receives the packet and reads the URL out of that packet's payload. In turn the CDSR redirector consults its configured-in policies and information base of load measurements to determine an appropriate place to terminate the requesting client.

Figure 19:
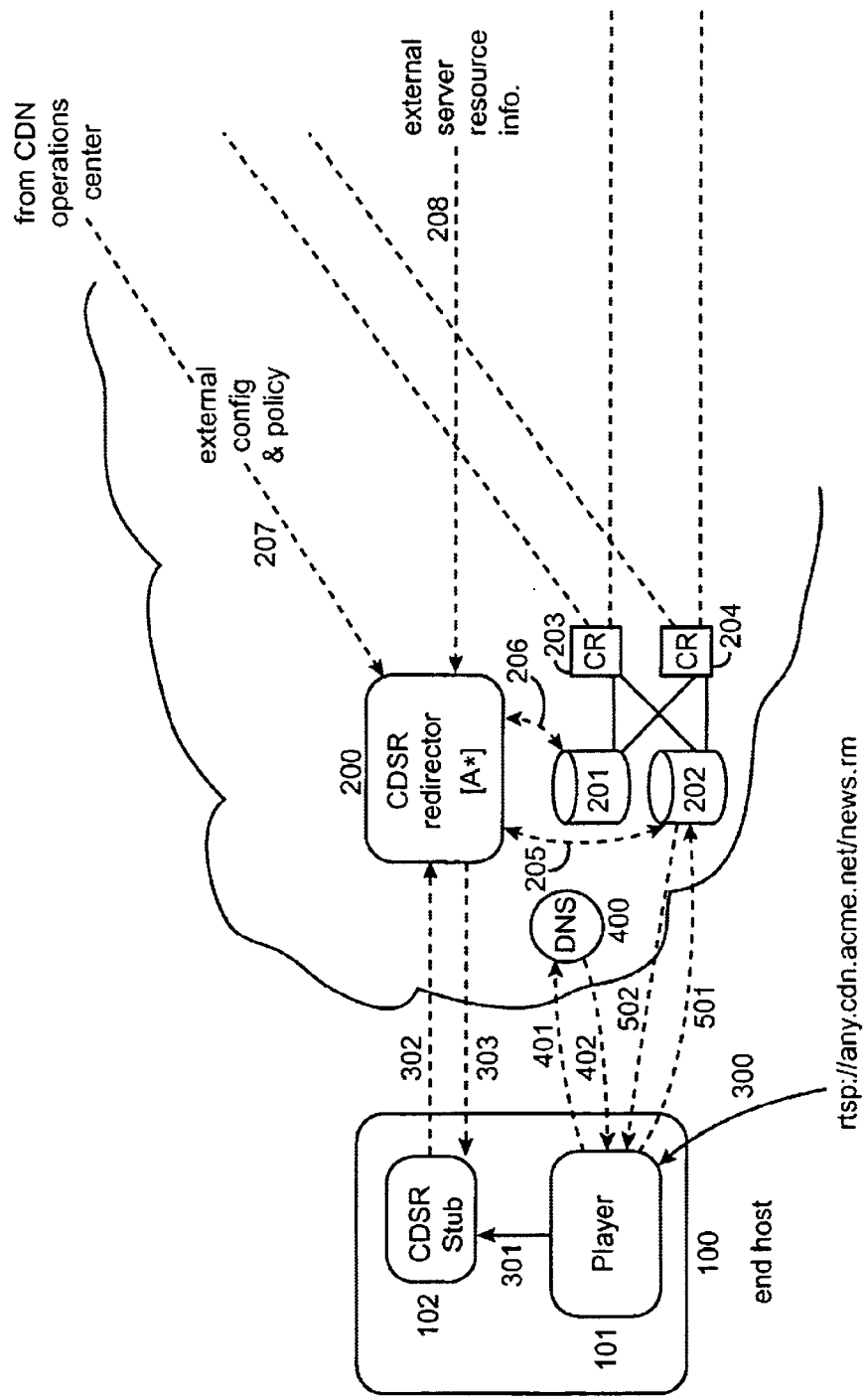
FIG. 19 is a network diagram illustrating an end-host invoking the CDSR system in the Internet infrastructure.

An example of this process is depicted in more depth in FIG. 19. Here a user presents a URL to a player (path 300) via some mechanism (e.g., by typing the URL into the user interface or by clicking on a hypertext link). The player then parses the URL and resolves the domain name any.cdn.acme.net by sending a DNS request along path 401 via the DNS resolver on the local host to a nearby DNS server 400. The server invokes the DNS system in a normal fashion to resolve the name into the anycast address A* (which is configured into the DNS by a network operator that appropriately configures the authoritative name server for the acme.net DNS subdomain). The DNS server in turn responds with the address A* via path 402.

At this point, the client determines that address A* is an APAR anycast address and consequently sends a service request message containing the URL to the CDSR stub 102 via path 301 all within the local host. The CDSR stub then sends a service request packet encapsulated in UDP addressed to A* into the network, which routes the packet to the topologically nearest CDSR redirector 200. The CDSR redirector then determines the address of a server to which the requesting client can connect basing its decision on an arbitrary set of configured policies and measurements gathered dynamically from the running system, as well as the requesting client's IP address. This policy and configuration information is dynamically assigned to the CDSR redirector via some external network management protocol that perhaps originates from the CDN operations center, e.g., over network path 207. This way, as policies evolve over time (e.g., based on external business relationships between network providers and the CDN service provider) the CDSR policies can be updated to honor certain desired service level agreements.

To properly load balance server and computational resources, the CDSR redirector monitors the local servers 201 and 202 via communication paths 205 and 206, respectively, or the CDSR can received load updates across an application-level multicast group as described above. Thus, the CDSR redirector can make informed decisions as to where to redirect clients based on server load. If the entire local service facility becomes fully loaded, the CDSR redirector may decide to redirect the client deeper into the network to servers not shown in the diagram. This decision can be based on information provided by the alternate servers (e.g., their availability and load) which can be communicated across the wide area, e.g., via path 208.

Given all this information, the CDSR redirector is then in a position to answer the original request packet. Presuming, for example, that it determined that server 201 is the most appropriate attachment point for the client, the CDSR redirector transmits a response packet back to the CDSR stub on the end host via path 302 containing the address of the server that can satisfy the content referenced by the original URL. In turn, the CDSR stub returns this result to the requesting application which then invokes a normal content transaction (e.g., a Web transfer or a instantiation of a streaming media flow) using traditional client-server protocols that terminate at the chosen server.

Finally, if the requested content is not yet present at server 201 (i.e., because it had not been previously pushed to that location or routed across the content broadcast network), then server 201 requests the content across the content network through a nearby content router, i.e., device 203 or device 204. A mechanism to fetch content in this fashion according to an application-level content routing network is described in McCanne et al. I.

4.2. Wide-area Deployment

The CDSR redirection mechanism described above can be deployed across a collection of autonomous systems in a fashion similar to the DNS-based redirection system described earlier. It would be obvious to an expert in the art that the variations of the DNS-based redirection system described above could be applied to the CDSR redirection mechanisms described in this section.

Figure 20:
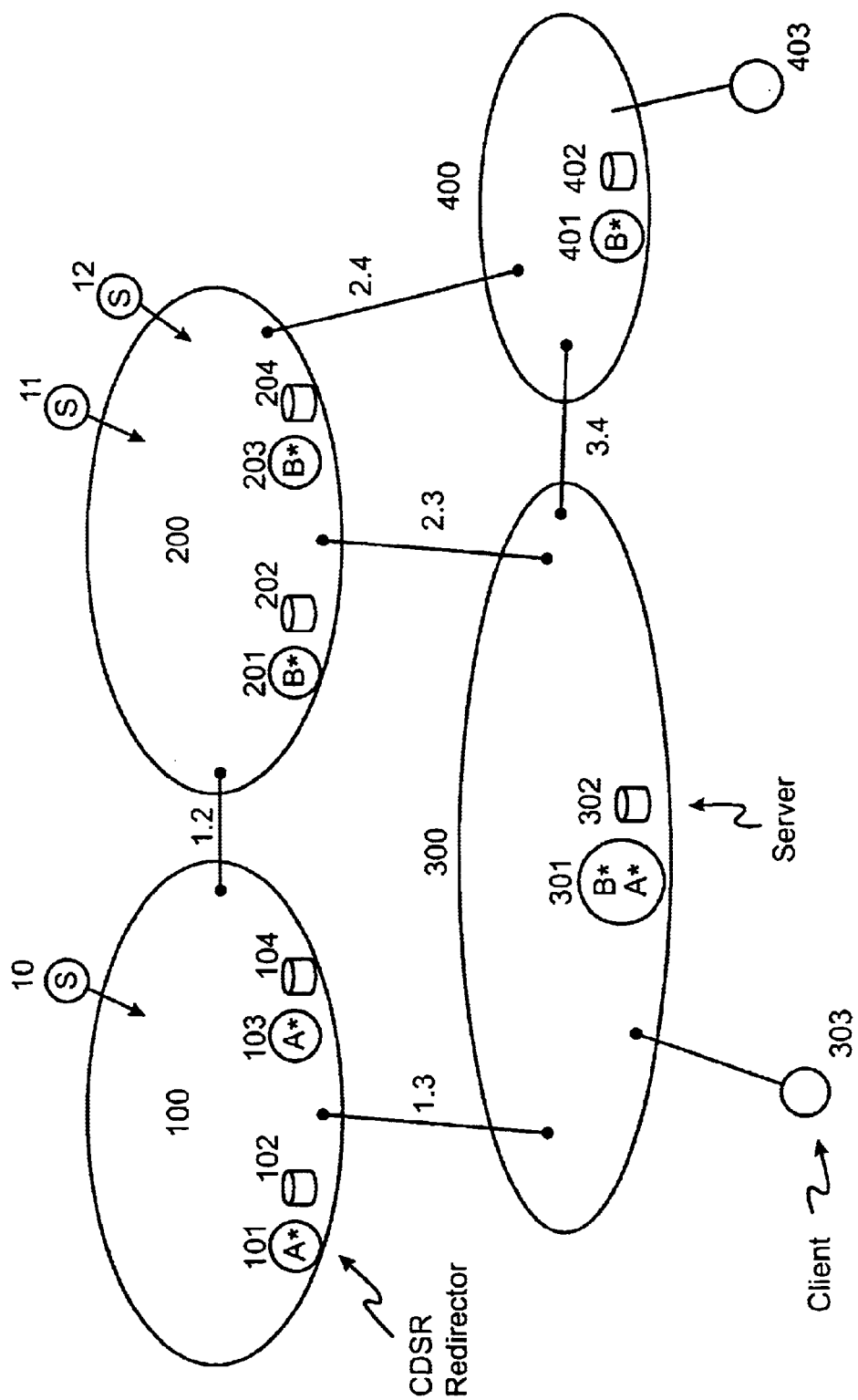
FIG. 20 is a network diagram illustrating wide-area deployment of CDSR.

To illustrate one such configuration, FIG. 20 shows how the CDSR is deployed across the wide-area between two cooperating content backbones and two content affiliates. The diagram shows a four ASs (100, 200, 300, and 400) interconnected at the IP layer with traditional layer 3 peering via links 1.2, 1.3, 2.3, 2.4, and 3.4. AS 100 contains two CDSR redirectors (101 and 103) each assigned the anycast address A* (which is taken from one of AS 100's assigned CIDR block) and servers 102 and 104. AS 200 contains two CDSR redirectors (201 and 203) each assigned the anycast address B* (which is taken from one of AS 200's assigned CIDR block) and servers 202 and 204. In this configuration, AS 100 is the A* content backbone and AS 200 is the B* content backbone.

AS 400 represents a content affiliate of the B* content backbone as it has deployed a CDSR redirector 401 addressed with the B* APAR anycast address. Server 402 provides the service attachment point for clients on the B* network. Similarly, AS 300 represents a content affiliate of both the A* and B* content backbones as it has deployed a CDSR redirector 301 addressed with the both the A* and B* APAR anycast addresses. Server 302 provides the service attachment point for clients on the B* network.

A content broadcast network that ties together the server installation to perform application-level multicast, traffic management, and so forth is assumed to exist (as described in McCanne et al. I) and is elided from this diagram to facilitate the present discussion. That is, application level connections exist among the various servers (102, 104, 202, 204, 302, and 402) and content sources 10, 11, and 12 (and perhaps other content routing devices not shown) to route content (i.e., live streams, on-demand clips, files, etc) from the injection points at the sources to each server that requires the content to honor the client requests.

Given this overall architecture, clients 303 and 403 can efficiently access content on either content network according to the reach of each respective network using CDSR. The system functions as follow. In the case of client 403, suppose the user requests content specified by a URL referring to content from source 11. The client decodes the URL (perhaps with the help of some external directory system like DNS) to determine that the URL refers to content on the B* backbone. Consequently, the client transmits that URL in a service request packet addressed to B*. APAR anycast routing delivers that request packet to CDSR redirector 401, which inspects the URL, selects an appropriate server (e.g., assume server 402) and returns a response indicating that the client should attach to the content network at server 402. The client 403 then initiates an application connection (e.g., using RTSP, HTTP, etc) to server 402 to request the content, which is fetched across the CDN as described above.

Now, suppose client 402 requests content specified by a URL referring to content from source 10. The client decodes the URL (perhaps with the help of some external directory system like DNS) to determine that the URL refers to content on the A* backbone. Consequently, the client transmits that URL in a service request packet addressed to A*. This time, APAR anycast routing delivers that request into AS 400, but because there are no A*-addressed CDSR redirectors within that AS, the IP routers forward the request packet toward AS 100 (i.e., which externally advertises the CIDR block containing address A*). Suppose the route traverses path 3.4 on its way to AS 100. Thus, the packet enters AS 300, but now since CDSR redirector 301 is assigned the A* address, the request packet is routed to that device instead of being routed on to AS 100. In turn, redirector 401 inspects the URL, selects an appropriate server (e.g., assume server 302) and returns a response indicating that the client should attach to the content network at server 302. The client 403 then initiates an application connection (e.g., using RTSP, HTTP, etc) to server 302 to request the content, which is fetched across the CDN as described above. Note that the client attaches to the closest node in the A*-rooted CDN; even though the client resides in AS 400 and service elements exist in that AS, server 302 in AS 300 is used instead because it is the closest element on the A* network.

4.3. Staged Deployment

One of the challenges facing the deployment of client-driven service rendezvous is the changes that must be made to the existing base of applications (i.e., Web browsers and streaming media clients) and the propagation of those changes into the active user community. Clearly, this transition cannot occur all at once and instead must progress gradually over time as vendors integrate such a capability into their applications and users upgrade their software. Thus, the system must be able to support a mixture of legacy applications alongside the new CDSR capable applications.

Fortunately, a staged deployment of CDSR capabilities is possible through a novel combination of CDSR redirection and explicit redirection. In this scheme, CDSR redirectors are deployed in parallel with explicit redirectors and URLs are structured so that they work effectively under either scenario. There are a number of possible ways to structure this coexistence and it would be obvious to an expert in the art how the schemes described herein could be combined to perform this sort of staged deployment.

One such approach is to run multiple redirection processes or agents that perform different types of redirection on each CDSR redirector. For example, one process could perform RTSP based redirection while another performs native CDSR redirection. The former process, for instance, would bind to TCP port 554 (i.e., the default RTSP port) while the latter would bind to some well-known UDP port, say 2554. Then, the content network would be configured with the convention that the server portion of any URL that referred to content on that network would resolve to that network's APAR anycast address. For example, within the URL rtsp://any.cdn.acme.net/news.rm the DNS name any.cdn.acme.net could resolve to the anycast IP address A*. Thus, when a legacy client processes this URL, it initiates an RTSP connection to the IP host assigned address A* at TCP port 554. In turn, the network routes the packets comprising this connection to the nearest CDSR redirector (via APAR anycast routing) and the RTSP redirector process running on that device establishes the connection. To carry out the redirection step, the RTSP redirector chooses a candidate server (as outlined earlier) and explicitly redirects the client to that server via an RTSP redirect message, which is built-in capability of the RTSP protocol. Thus the client is properly redirected to an appropriate, nearby server.

Using the same infrastructure, a CDSR-aware client inspects the address A* returned by DNS for the name any.cdn.acme.net and determines that A* is an APAR anycast address. Consequently, the client invokes the CDSR redirection system by transmitting a service request UDP packet containing the URL to address A* at UDP port 2554. In turn, the network routes the packets comprising this connection to the nearest CDSR redirector (via APAR anycast routing) and, this time, the CDSR redirector process running on that device receives the request. To carry out the redirection step, the CDSR redirector chooses a candidate server (as outlined earlier) and returns a response packet that contains the address of this server to be used for the service transaction (e.g., Web request or streaming media flow). The response packet may also contain other hints that could be useful to the client, e.g., indicating that the client may use the returned server address for all future content requests with the same server component name (e.g., any.cdn.acme.net), or that the client may use the address in this fashion for some period of time (e.g., 5 minutes). The response packet may also contain predictive hints that allows clients to infer more information about what URLs are handled by the CDSR redirection system.

4.4. Web Server Staged Deployment

A similar strategy can be adopted for other types of protocols and applications like Web browsers. In this case, an HTTP redirection agent runs in parallel to a CDSR redirector running on the APAR anycast-addressed device. For example, a legacy Web browser that invokes the URL http://any.cdn.acme.net/index.html would attempt to connect to any.cdn.acme.net, which again is assumed to resolve to the APAR anycast address A*.

That is, one process performs HTTP based redirection while another performs native CDSR redirection. The former process, for instance, binds to TCP port 80 (i.e., the default HTTP port) while the latter binds to a well-known UDP port, say 2554. Then, the content network is configured with the convention that the server portion of any URL that referred to content on that network resolves to that network's APAR anycast address. For example, within the URL http://any.cdn.acme.net/index.html the DNS name any.cdn.acme.net resolves to the anycast IP address A*. Thus, when a legacy client processes this URL, it initiates an HTTP connection to the IP host assigned address A* at TCP port 80. In turn, the network routes the packets comprising this connection to the nearest CDSR redirector (via APAR anycast routing) and the HTTP redirector process running on that device establishes the connection. To carry out the redirection step, the HTTP redirector chooses a candidate server (as outlined earlier) and explicitly redirects the client to that server via an HTTP redirect message, which is built-in capability of the HTTP protocol. Thus the client is properly redirected to an appropriate, nearby server.

Using the same infrastructure, a CDSR-aware client inspects the address A* returned by DNS for the name any.cdn.acme.net and determines that A* is an APAR anycast address. Consequently, the client invokes the CDSR redirection system by transmitting a service request UDP packet containing the URL to address to A* at UDP port 2554. In turn, the network routes the packets comprising this connection to the nearest CDSR redirector (via APAR anycast routing) and, this time, the CDSR redirector process running on that device receives the request. To carry out the redirection step, the CDSR redirector chooses a candidate server (as outlined earlier) and returns a response packet that contains the address of this server to be used for the Web transfer. The response packet may also contain other hints that could be useful to the client, e.g., indicating that the client may use the returned server address for all future content requests with the same server component name (i.e., any.cdn.acme.net), or that the client may use the address in this fashion for some period of time (e.g., 5 minutes). The response packet may also contain predictive hints that allows clients to infer more information about what URLs are handled by the CDSR redirection system.

Figure 21:
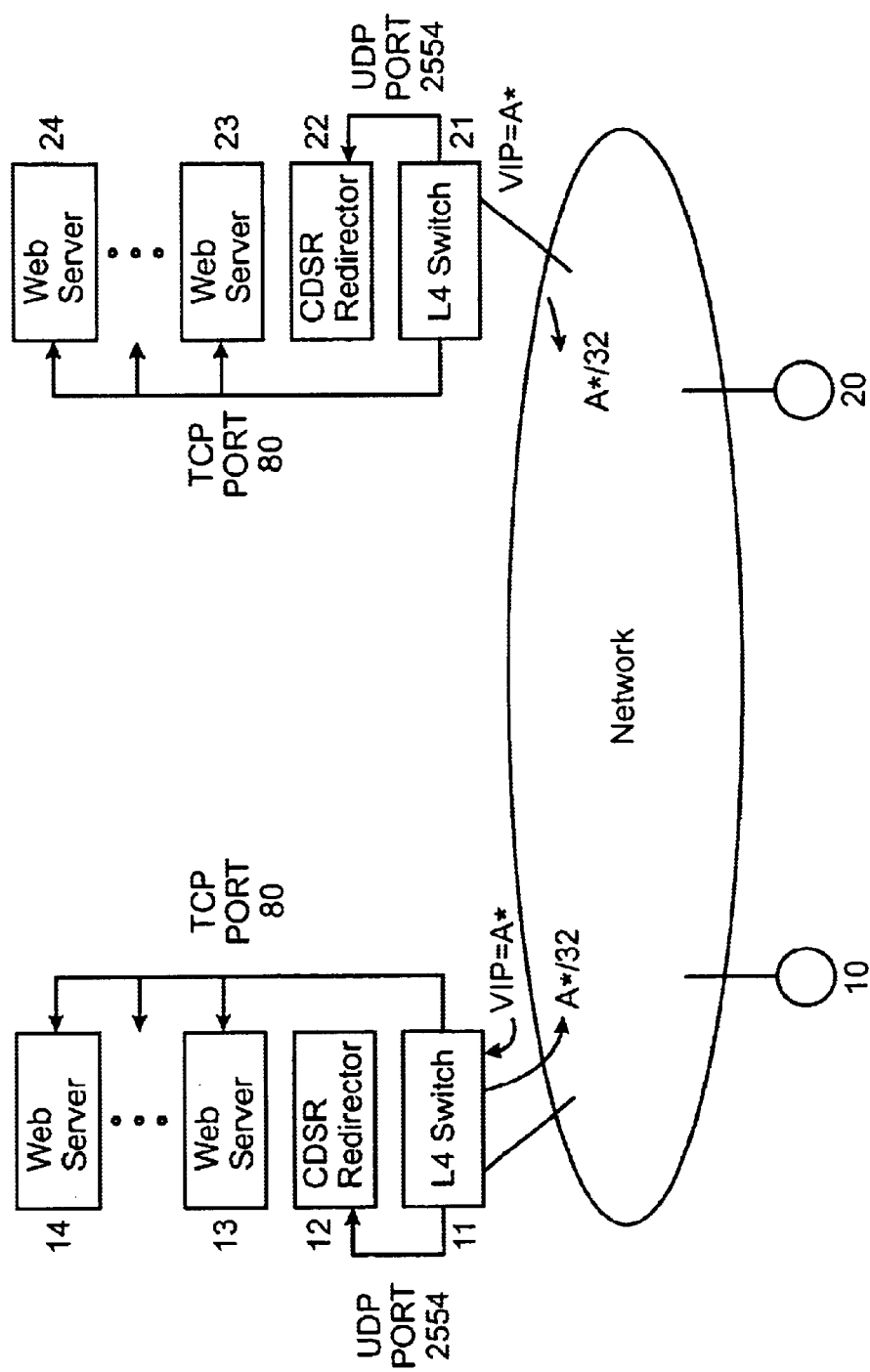
FIG. 21 illustrates a combination of CDSR with traditional load-balanced Web servers.

In another configuration, the HTTP redirection agent is replaced with an actual Web server. To scale this configuration, the Web server may optionally be load-balanced with a layer 4 switch. FIG. 21 illustrates this scheme. Here, layer 4 switch 11 is assigned the virtual IP address A* and configured to advertise the A*/32 host route into the network routing protocol to effect APAR anycast routing. Switch 11 is configured to route UDP port 2554 traffic to the CDSR redirector 12 and route all Web traffic (on TCP port 80) to Web servers 13 and 14 (which may be clustered to larger sizes). Switch 21 is similarly configured against CDSR redirector 22 and Web servers 23 and 24.

First, assume Web browser clients 10 and 20 are legacy applications that are not aware of CDSR redirection. In this case, when client 10 invokes the URL http://any.cdn.acme.net/index.html it fetches the content directly from the server above switch 11, whereas client 20 fetches the content from the server above switch 21.

Now assume clients 10 and 20 are CDSR aware. When client 10 parses the URL, it determines that the server component address is an APAR anycast address and transmits a service request packet to the A* anycast address containing the URL. The layer 4 switch routes this packet to CDSR redirector 12, which selects a nearby server or some other server if the local cluster is overloaded (as described earlier) and returns a response message indicating that server, say server 14. The client then retrieves the content from server 14 using HTTP. A similar transaction occurs between client 20 and the layer 4 switch 21 when client 20 invokes the URL in question.

Using the above techniques, servers can be easily load balanced. AN APAR-DNS routing scheme can also be used to limit requests from unauthorized clients. For example, the request for domain name resolution might include metadata that validates an authorized client. The APAR-DNS server checks the metadata and if the client appears to be authorized, the APAR-DNS server responds to the request with a resolution of the domain name to an IP address and a port number that, by preagreement between the content server and the APAR-DNS server or otherwise, is a port that the content server will connect over. If the client does not appear to the APAR-DNS server to be authorized, the APAR-DNS server will return an IP address and port number of a port that the content server ignores.

One way in which content peering as described above can be used is within content distribution networks run by network service providers that peer with other such content distribution networks through "context exchange" providers. In such an architecture, a content exchange is service entity that brokers relationships between the content providers and the distribution networks. In this way, content exchanges can enter into relationships with content providers as their customers but rely upon the content distribution networks to actually carry the traffic. This leads to a landscape where a number of content exchanges emerge to act as brokers between content providers and content distribution networks owned and operated by the network service providers and the number of content exchanges is small enough for efficient operation.

A novel data stream broadcast distribution scheme using content peering and other novel elements have now been described.

What is claimed is:

1. A method, in a network interconnecting a plurality of content providers and a plurality of clients, for providing content to a client, comprising the steps of:

coupling each of the plurality of content providers to at least one content distribution network of a plurality of content distribution networks, wherein the client is coupled to at least one of the plurality of content distribution networks;

sending a request for the content from the client to a redirector node that receives requests, wherein a redirector at the redirector node provides the client directions to a server available to serve the requested content;

when the client's content distribution network is a primary content distribution network for the content provider providing the request content, redirecting the client to a server within the client's content distribution network;

redirecting the client to a server within the client's content distribution network when the client's content distribution network is not a primary content distribution network for the content provider but the client's content distribution network has a content peering relationship with a primary content distribution network for the content provider; and redirecting the client to a server outside the client's content distribution network when the client's content distribution network is not a primary content distribution network for the content provider and the client's content distribution network does not have a content peering relationship with a primary content distribution network for the content provider.

2. A method, in a network interconnecting a plurality of content providers and a plurality of clients, for providing content to a client, comprising:

coupling each of the plurality of content providers to at least one content distribution network of a plurality of content distribution networks, wherein the client is coupled to at least one of the plurality of content distribution networks;

sending a request for the content, including a reference to a resolver server and a content reference, from the client to a redirector node that receives requests, wherein a redirector at the redirector node provides the client directions to a server available to serve the request content;

when the client's content distribution network is a primary content distribution network for the content provider providing the requested content, redirecting the client to a server within the client's content distribution network; and sending a resolution request from the redirector node to the resolver server including the content reference and using a response from the resolver server to resolve a process for obtaining the content.

3. The method of claim 2, further comprising a step of providing client connection information to a content provider when content is served from outside the content provider's primary distribution network.

4. The method of claim 2, wherein the response from the resolver server includes instructions for joining an application-level multicast channel to receive the content.

5. The method of claim 2, wherein the response from the resolver server includes instructions for pulling a cascaded feed from a streaming-media server.

6. The method of claim 2, further comprising the step of disseminating content routing policies to the redirectors using application-level multicast routing.

7. The method of claim 2, further comprising the step of disseminating server load information to the redirectors using application-level multicast routing.

8. The method of claim 2, further comprising the step of disseminating resource availability between content distribution networks.

9. The method of claim 2, further comprising the step of disseminating replication information to the redirectors using application-level multicast routing.

10. The method of claim 2, wherein the step of sending the request for the content comprises a step of sending an explicit service request to an anycast address to imply topological locality via anycast routing.

11. The method of claim 10 wherein redirection is performed based on the topological locality context.

12. The method of claim 2, further comprising a step of using redirection in remote autonomous systems to load balance server farms in nearby autonomous systems.

* * * * *